(12) United States Patent
Petty

(10) Patent No.: US 11,108,885 B2
(45) Date of Patent: *Aug. 31, 2021

(54) SYSTEMS AND METHODS FOR PROVIDING A VISUAL CONTENT GALLERY WITHIN A CONTROLLED ENVIRONMENT

(71) Applicant: **Global Tel*Link Corporation**, Reston, VA (US)

(72) Inventor: Alex Petty, Mobile, AL (US)

(73) Assignee: **Global Tel*Link Corporation**, Reston, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/182,062

(22) Filed: Nov. 6, 2018

(65) Prior Publication Data

US 2019/0141164 A1 May 9, 2019

Related U.S. Application Data

(63) Continuation of application No. 15/662,103, filed on Jul. 27, 2017, now Pat. No. 10,122,825.

(51) Int. Cl.
*G06F 15/16* (2006.01)
*H04L 29/08* (2006.01)
(Continued)

(52) U.S. Cl.
CPC ........... *H04L 67/327* (2013.01); *G06F 21/10* (2013.01); *G06F 21/31* (2013.01);
(Continued)

(58) Field of Classification Search
CPC .......... H04L 51/12; H04L 51/10; H04L 63/08
See application file for complete search history.

(56) References Cited

U.S. PATENT DOCUMENTS 5,757,417 A 5/1998 Aras et al.
5,796,948 A 8/1998 Cohen
(Continued)

FOREIGN PATENT DOCUMENTS

WO WO 2013/096944 A1 6/2013

OTHER PUBLICATIONS

Copyright Registration Record for "iPhone: The Missing Manual," 6th ed., 2012; 1 page
(Continued)

*Primary Examiner* — Yves Dalencourt
(74) *Attorney, Agent, or Firm* — Sterne, Kessler, Goldstein & Fox P.L.L.C.

(57) ABSTRACT

Methods and systems for providing a visual content gallery within a controlled environment are disclosed herein. A content gallery server receives a content submission from an inmate device within the controlled environment. Further, the content gallery server determines that the content submission does not include prohibited content based on comparing the content submission to a blacklist of prohibited information. When the content submission does not include prohibited content, the content gallery server adds the content submission to a network accessible content gallery corresponding to an inmate associated with the inmate device. Further, authorized friends and family of the inmate may view the content submission and provide comments on the content submission.

20 Claims, 12 Drawing Sheets

(51) Int. Cl.
*H04L 29/06* (2006.01)
*G06F 21/10* (2013.01)
*G06T 11/60* (2006.01)
*G06K 9/00* (2006.01)
*G06Q 99/00* (2006.01)
*G06F 21/31* (2013.01)

(52) U.S. Cl.
CPC ..... *G06K 9/00288* (2013.01); *G06K 9/00295* (2013.01); *G06Q 99/00* (2013.01); *G06T 11/60* (2013.01); *H04L 63/0245* (2013.01); *H04L 63/0414* (2013.01); *H04L 63/08* (2013.01); *H04L 63/10* (2013.01); *H04L 63/102* (2013.01); *H04L 67/2828* (2013.01); *H04L 67/306* (2013.01); *G06F 2221/0724* (2013.01); *G06F 2221/2149* (2013.01); *G06T 2200/24* (2013.01)

(56) References Cited

U.S. PATENT DOCUMENTS

| | | | |
|---|---|---|---|
| 6,330,537 | B1 | 12/2001 | Davis et al. |
| 6,684,240 | B1 | 1/2004 | Goddard |
| 6,734,900 | B2 | 5/2004 | Mayhew |
| 6,740,802 | B1 | 5/2004 | Browne, Jr. |
| 6,810,527 | B1 | 10/2004 | Conrad et al. |
| 6,829,582 | B1 | 12/2004 | Barsness |
| 7,027,659 | B1 | 4/2006 | Thomas |
| 7,752,274 | B2 | 7/2010 | Pagan |
| 7,818,392 | B1 | 10/2010 | Martino et al. |
| 7,911,513 | B2 | 3/2011 | Garrison et al. |
| 7,973,230 | B2 | 7/2011 | Mahowald |
| 8,005,913 | B1 | 8/2011 | Carlander |
| 8,358,837 | B2 | 1/2013 | Shakya et al. |
| 8,380,725 | B2 | 2/2013 | Borst et al. |
| 8,537,981 | B1 | 9/2013 | Cyriac et al. |
| 8,700,409 | B1 | 4/2014 | Persson et al. |
| 8,789,040 | B1 | 7/2014 | Callary |
| 8,832,374 | B1 | 9/2014 | Schaefers |
| 8,917,848 | B2 | 12/2014 | Torgersrud et al. |
| 8,929,525 | B1 | 1/2015 | Edwards |
| 9,083,850 | B1 | 7/2015 | Higgs |
| 9,106,789 | B1 | 8/2015 | Shipman, Jr. et al. |
| 9,282,087 | B1 | 3/2016 | Fredinburg et al. |
| 9,332,014 | B2 | 5/2016 | Keiser et al. |
| 9,674,198 | B1 | 6/2017 | Hodge |
| 10,015,546 | B1 | 7/2018 | Petty |
| 10,122,825 | B1* | 11/2018 | Petty ................. H04L 67/2828 |
| 10,405,007 | B2 | 9/2019 | Hodge |
| 10,516,918 | B2 | 12/2019 | Petty |
| 2001/0001159 | A1 | 5/2001 | Ford |
| 2002/0147782 | A1 | 10/2002 | Dimitrova et al. |
| 2003/0126267 | A1 | 7/2003 | Gutta et al. |
| 2003/0192044 | A1 | 10/2003 | Huntsman |
| 2004/0006767 | A1 | 1/2004 | Robson et al. |
| 2004/0172652 | A1 | 9/2004 | Fisk et al. |
| 2005/0022229 | A1 | 1/2005 | Gabriel et al. |
| 2005/0268317 | A1 | 12/2005 | Cormack et al. |
| 2006/0031870 | A1 | 2/2006 | Jarman et al. |
| 2006/0075015 | A1 | 4/2006 | Wu et al. |
| 2006/0095262 | A1 | 5/2006 | Danieli |
| 2006/0280177 | A1 | 12/2006 | Gupta et al. |
| 2007/0015573 | A1 | 1/2007 | Angell |
| 2007/0157281 | A1 | 7/2007 | Ellis et al. |
| 2007/0179355 | A1 | 8/2007 | Rosen |
| 2008/0059991 | A1 | 3/2008 | Romano |
| 2008/0134282 | A1 | 6/2008 | Fridman et al. |
| 2008/0177834 | A1 | 7/2008 | Gruhl et al. |
| 2008/0184284 | A1 | 7/2008 | O'Hern |
| 2008/0201158 | A1 | 8/2008 | Johnson et al. |
| 2008/0250484 | A1 | 10/2008 | Chong et al. |
| 2009/0013052 | A1 | 1/2009 | Robarts et al. |
| 2009/0013359 | A1 | 1/2009 | Butler et al. |
| 2009/0089828 | A1 | 4/2009 | Carlsgaard et al. |
| 2009/0177670 | A1 | 7/2009 | Grenier et al. |
| 2009/0228557 | A1 | 9/2009 | Ganz et al. |
| 2009/0234784 | A1 | 9/2009 | Buriano et al. |
| 2009/0240586 | A1 | 9/2009 | Ramer et al. |
| 2009/0254499 | A1 | 10/2009 | Deyo |
| 2009/0313546 | A1 | 12/2009 | Katpelly et al. |
| 2009/0328093 | A1 | 12/2009 | Cansler et al. |
| 2010/0094878 | A1 | 4/2010 | Soroca et al. |
| 2010/0138455 | A1 | 6/2010 | Alewine |
| 2010/0312542 | A1 | 12/2010 | Van Wyk et al. |
| 2011/0004831 | A1 | 1/2011 | Steinberg et al. |
| 2011/0065419 | A1 | 3/2011 | Book et al. |
| 2011/0093473 | A1 | 4/2011 | Basso et al. |
| 2011/0153328 | A1 | 6/2011 | Lim et al. |
| 2011/0237221 | A1 | 9/2011 | Prakash et al. |
| 2011/0249073 | A1 | 10/2011 | Cranfill et al. |
| 2011/0251901 | A1 | 10/2011 | Kwon et al. |
| 2011/0307548 | A1 | 12/2011 | Fisk et al. |
| 2012/0124638 | A1 | 5/2012 | King et al. |
| 2012/0201362 | A1 | 8/2012 | Crossan et al. |
| 2012/0239763 | A1 | 9/2012 | Musil |
| 2012/0257583 | A1 | 10/2012 | Keiser et al. |
| 2012/0262271 | A1 | 10/2012 | Torgersrud et al. |
| 2012/0324244 | A1 | 12/2012 | Zipperer et al. |
| 2013/0090917 | A1 | 4/2013 | Chalmers et al. |
| 2013/0179949 | A1 | 7/2013 | Shapiro |
| 2013/0252575 | A1 | 9/2013 | Ewell et al. |
| 2014/0033230 | A1 | 1/2014 | Hanna et al. |
| 2014/0215391 | A1 | 7/2014 | Little et al. |
| 2014/0218466 | A1 | 8/2014 | Bloms et al. |
| 2014/0253663 | A1 | 9/2014 | Edwards |
| 2014/0267547 | A1 | 9/2014 | Torgersrud et al. |
| 2014/0270126 | A1 | 9/2014 | Torgersrud et al. |
| 2014/0273929 | A1 | 9/2014 | Torgersrud |
| 2014/0279789 | A1 | 9/2014 | Torgersrud |
| 2014/0280524 | A1 | 9/2014 | Paradise et al. |
| 2014/0280559 | A1 | 9/2014 | Torgersrud |
| 2014/0280632 | A1 | 9/2014 | Torgersrud et al. |
| 2014/0282898 | A1 | 9/2014 | Torgersrud |
| 2014/0304283 | A1* | 10/2014 | Athsani ................. G06F 16/958 707/754 |
| 2014/0325561 | A1 | 10/2014 | Allen et al. |
| 2014/0344956 | A1 | 11/2014 | Garben |
| 2015/0050910 | A1 | 2/2015 | Torgersrud |
| 2015/0070516 | A1 | 3/2015 | Shoemake et al. |
| 2015/0188925 | A1 | 7/2015 | Gupta |
| 2015/0215254 | A1 | 7/2015 | Bennett |
| 2015/0301703 | A1 | 10/2015 | Steinberg et al. |
| 2016/0191484 | A1 | 7/2016 | Gongaware |
| 2016/0246791 | A1 | 8/2016 | Long et al. |
| 2016/0300388 | A1 | 10/2016 | Stafford |
| 2016/0381083 | A1* | 12/2016 | Torgersrud ............. G06F 21/32 709/225 |
| 2017/0064384 | A1 | 3/2017 | Sahoo et al. |
| 2017/0262635 | A1 | 9/2017 | Strauss et al. |
| 2017/0272435 | A1 | 9/2017 | Hodge |
| 2017/0272440 | A1 | 9/2017 | Hodge |
| 2019/0037247 | A1 | 1/2019 | Hodge |
| 2019/0069029 | A1 | 2/2019 | Petty |
| 2019/0387255 | A1 | 12/2019 | Hodge |

OTHER PUBLICATIONS

DSKeye Gigabit Product Brief, Bitec Ltd. 2007; 2 pages.
Excerpt from Merriam-Webster's Collegiate Dictionary, Tenth Edition, 2002; p. 841.
Excerpt from the American Heritage Dictionary, 5th Ed. (2016); p. 679.
Excerpts from "iPhone: The Missing Manual," 6th ed., Sebastopol, CA: O'Reilly Media, 2012; 556 (submitted in 10 parts).
File History of U.S. Pat. No. 9,083,850, U.S. Appl. No. 13/931,857, filed Jul. 14, 2015.
Gotsopoulos et al., "Remote Controlled DSP Based Image Capturing and Processing System Featuring Two-Axis Motion," Proceedings of the 4th European DSP in Education and Research Conference, Dec. 1-2, 2010; pp. 32-36.

(56) References Cited

OTHER PUBLICATIONS

International Search Report and Written Opinion directed to International Patent Appl. No. PCT/US2017/031317, dated Aug. 2, 2017; 16 pages.
International Search Report and Written Opinion directed to International Patent Application No. PCT/US2017/022163, dated Jun. 9, 2017; 12 pages.
Prosecution History of U.S. Pat. No. 8,929,525, U.S. Appl. No. 14/323,582, filed Jul. 3, 2014.
U.S. Appl. No. 61/801,861, filed Mar. 15, 2013; 77 pages.
OpenSong Getting Started. Online, retrieved from www.archive.org, Archive date: 2016; 6 pages.
ScoreCloud, Online, retrieved from www.archive.org, Archive date: 2016; 3 pages.
Censorship of Music (Wikipedia), retrieved from www.archive.org, Archive date: 2016; 15 pages.

* cited by examiner

SYSTEMS AND METHODS FOR PROVIDING A VISUAL CONTENT GALLERY WITHIN A CONTROLLED ENVIRONMENT

CROSS REFERENCE TO RELATED APPLICATIONS

This application claims the benefit of U.S. application Ser. No. 15/662,103, filed Jul. 27, 2017, which is incorporated herein by reference in its entirety. This application is related to co-pending U.S. patent application Ser. No. 15/662,092 by Petty, entitled "SYSTEM AND METHOD FOR AUDIO VISUAL CONTENT CREATION AND PUBLISHING WITHIN A CONTROLLED ENVIRONMENT" filed on Jul. 27, 2017, and co-pending U.S. patent application Ser. No. 15/661,840 by Hodge, entitled "SYSTEMS AND METHODS FOR A VIDEO SHARING SERVICE WITHIN CONTROLLED ENVIRONMENTS" filed on Jul. 27, 2017, which are each incorporated herein by reference in its entirety.

FIELD OF THE INVENTION

This disclosure relates to systems and methods for a visual content gallery within a controlled environment.

BACKGROUND OF THE INVENTION

In a controlled environment, such as a correctional facility or prison, administrators may seek to provide opportunities for inmates to exchange visual content with family and/or friends. However, administrators must ensure that the visual content is appropriate for distribution to inmates within the controlled environment and/or media consumers outside of the controlled environment. For example, administrators may not want to distribute visual content containing threats of violence and derogatory references. Further, administrators may not want to distribute visual content that could be used in support of illegal activity.

BRIEF DESCRIPTION OF THE DRAWINGS/FIGURES

A further understanding of the invention can be obtained by reference to a preferred embodiment set forth in the illustrations of the accompanying drawings. Although the illustrated embodiment is merely exemplary of systems for carrying out the invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the invention, reference is now made to the following drawings in which.

DETAILED DESCRIPTION OF THE INVENTION

As required, a detailed illustrative embodiment of the invention is disclosed herein. However, techniques, systems and operating structures in accordance with the invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the invention. The following presents a detailed description of the preferred embodiment of the invention.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or customize for various applications such exemplary embodiments, without undue experimentation, without departing from the spirit and scope of the disclosure. Therefore, such modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Figure 1:
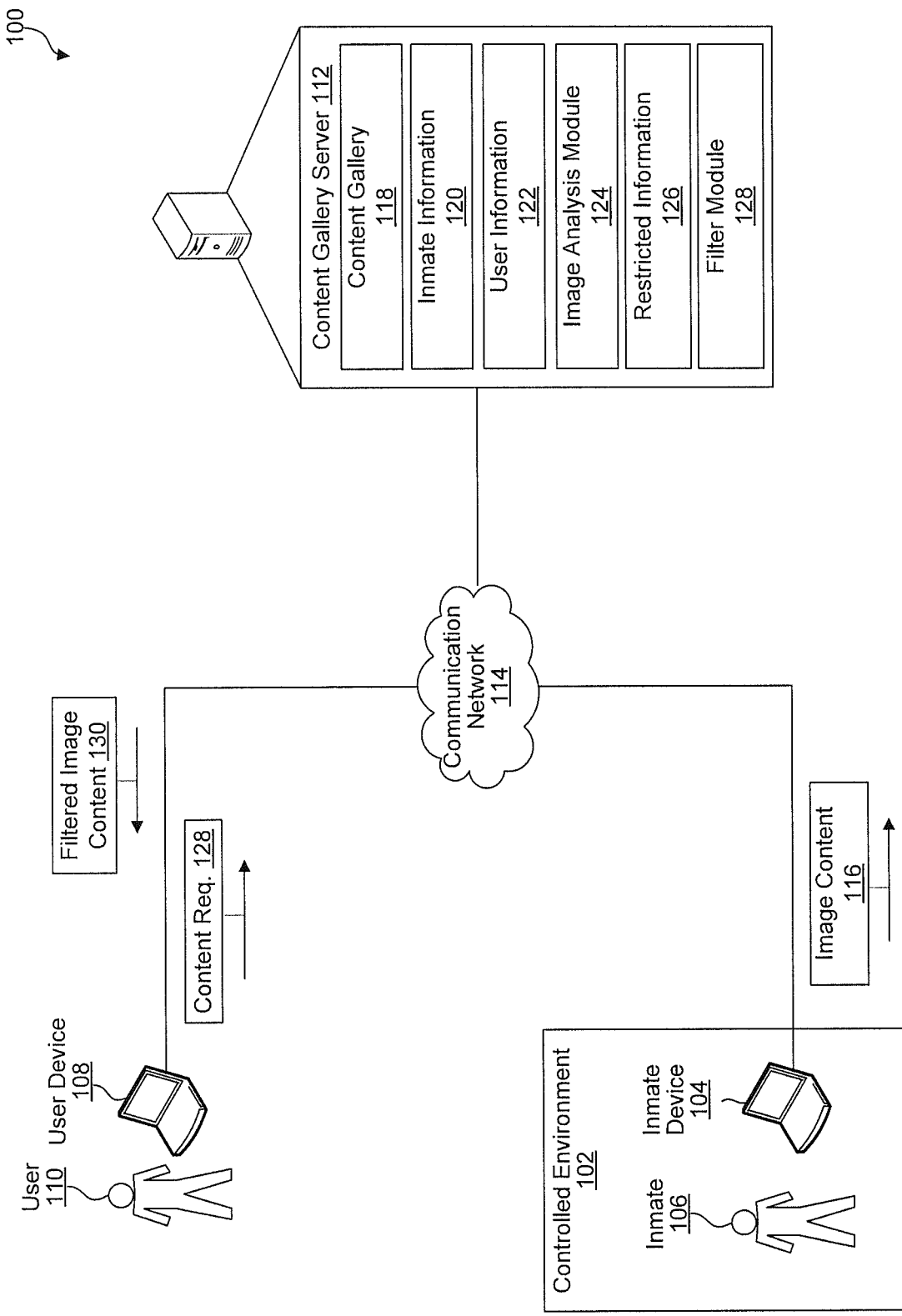
FIG. 1 illustrates a block diagram of an example framework for providing a visual content gallery system in a controlled environment, according to exemplary embodiments.

FIG. 1 illustrates a block diagram of an example framework for providing a visual content gallery system 100 in a controlled environment 102 (e.g., correctional facility, detention center, etc.), according to an exemplary embodiment. In some embodiments, the controlled environment 102 is arranged into areas, stations, or regions associated with various functions (e.g., cell block, dining hall, commissary, library, exercise yard, hallway(s), etc.). FIG. 1 shows interactions between an inmate device 104 associated with an inmate 106, a user device 108 associated with a user 110, and a content gallery server 112.

As illustrated in FIG. 1, the inmate device 104, the user device 108, and the content gallery server 112 communicate via the network(s) 114. The network 114 may include any or all of a private network, personal area network (PAN), Local-Area Network (LAN), a Wide-Area Network (WAN), or the Internet. Further, the connection between any of the inmate device 104, the user device 108, and/or the content gallery server 112, and the network 114 may be a wireless connection (e.g., Bluetooth™, Wi-Fi connection, etc.), or a wired connection (e.g., Ethernet, universal serial bus (USB), etc.).

The inmate 106 may be confined to the controlled environment 102. Additionally, the inmate 106 is permitted to use the inmate device 104 for entertainment purposes within the controlled environment 102. Some examples of the inmate device 104 and/or the user device 108, include smart phones and mobile communication devices, tablet computing devices, desktops, laptops, netbooks and other portable computers, wearable computing devices, and any other computing device capable of sending communications to the content gallery server 112. In an embodiment in which the inmate 106 endeavors to share image content 116 with friends and/or family (e.g., the user 108), the inmate 106 can capture the image content 116 using an image capturing component (e.g., camera) of the inmate device 104. For example, the inmate 106 may capture a photograph (i.e., the image content 116) of the inmate 106 and a relative within the controlled environment 102.

The content gallery server 112 manages access to the image content 116 by the inmate device 104 and the user device 108. As illustrated in FIG. 1, the content gallery server 112 includes a content gallery 118 associated with the inmate 106, inmate information 120, user information 122, an image analysis module 124, restricted information 126, and a filter module 128. The content gallery 118 stores visual content submitted by the inmate device 104 and/or the user device 108. As described herein, visual content includes images, photographs, picture slideshows, collages, video clips, and video playlists. Additionally, the content gallery 118 stores comments and/or metadata associated with the visual content. Some examples of comments include textual content, image content, video content, audio content, icons, and/or emoticons associated with the visual content of the content gallery 118. In some embodiments, comments are submitted by the inmate 106 via the inmate device 104, and/or the user 110 via the user device 108. Metadata as referred to herein includes one or more attributes of the visual content, such as a title of the visual content, a filename of the visual content, name of the creator of the visual content, resolution, duration, dimensions, device identifier of a device that captured the visual content, usage and licensing rights, location data identifying a location where the visual content was captured, date and time information identifying when the visual content was captured, image capturing device settings, thumbnail of the visual content, etc.

The inmate information 120 includes personal information corresponding to the inmate 106, such as authentication information, authorization information, demographic information, content gallery browsing history, content gallery comment history, content gallery content upload history, filter application history, device usage history, facial recognition information associated with the inmate 106, speech recognition information associated with the inmate 106, filter preferences, previous residences or correctional facilities, gang affiliations, related legal personnel (e.g., judges, prosecuting attorneys, victims associated with legal proceedings against the inmate 106, witnesses associated with legal proceedings against the inmate 106, etc.), languages/dialects spoken by the inmate 106, incident reports, visitor logs, etc.

The user information 122 includes personal information corresponding to the user 110, such as such as authentication information, authorization information, demographic information, content gallery browsing history, content gallery comment history, content gallery content upload history, filter application history, device usage history, facial recognition information associated with the user, speech recognition information associated with the user, residences, employers, user devices, associated inmates, etc. In some embodiments, the administration of the controlled environment 102 receives a registration application from the user 110 and/or user device 108, and approves the user 110 to use the visual content gallery system 100. For example, the content gallery server 112 may provide the user 110 with an account within the visual content gallery system 100.

As illustrated in FIG. 1, the inmate device 104 sends the image content 116 to the content gallery server 112. Upon receipt of the image content 116, the content gallery server 112 determines whether the image content 116 contains unauthorized content that renders the image content 116 inappropriate for inclusion in the content gallery 118. For example, the content gallery server 112 employs the image analysis module 124 to perform image recognition on the image content 116. In some embodiments, the image analysis module 124 utilizes machine learning techniques to extract and/or detect image features of the image content 116. Further, the content gallery server 112 determines whether the image content 116 contains unauthorized content by comparing the image features of the image content 116 to the restricted information 126.

The restricted information 126 includes prohibited image features, prohibited video features, machine learning models for determining the presence of prohibited information (e.g., machine learning models for detecting flesh tones and/or skin), prohibited body movements (obscene gestures, gang signs, etc.), and/or prohibited images (photographs, text captions, text overlay, etc.). Further, the restriction information 126 includes prohibited words, phrases, terms, and/or subject matters in a variety of languages and/or dialects. Additionally, the restricted information 126 includes words, phrases, and/or terms that sound similar to and/or rhyme with the prohibited words, phrases, and/or terms. In addition, the restricted information 126 includes prohibited location information identifying geographic locations that are not permitted to be captured in the image content 116. In some embodiments, the prohibited location information includes global positioning system data, indoor positioning system data, GLONASS data, etc.

As an example, the image analysis module 124 identifies that the image content 116 includes a person making an obscene gesture based on the restricted information 126. As another example, the image analysis module 124 identifies that the image content 116 includes an obscene text caption based on the restricted information 126. As yet another example, the image analysis module 124 identifies a person in the image content 116 voices a racial epithet based on the restricted information 126.

If the content gallery server 112 determines that the image content 116 does not include any of the restricted information 126, the image content 116 is stored in the content gallery 118. Once the image content 116 is stored in the content gallery 118, the user 110 can view the image content 116. In some embodiments, the user device 108 sends a content request 130 to the content gallery server indicating that the user 110 would like to view the image content 116. Upon receipt of the content request 130, the content gallery server 112 determines whether the user 110 is authorized to view the image content 116 based at least in part on the inmate information 120 and/or the user information 122. For instance, the inmate information 120 and/or user information 122 may indicate that the inmate 106 and user 110 are married. In addition, the inmate information 120 and/or user information 122 may indicate that the inmate 106 has authorized the user 110 to view content associated with the inmate 106 in the content gallery 118. In certain embodiments, the administration of the controlled environment 102 manages the authorization information of the inmate information 120 and/or user information 122. For example, the administration modifies the inmate information 120 and/or user information 122 to permit the user 110 to view the contents of the content gallery 118.

Further, the content gallery server 112 further determines whether any filters should be applied to the image content 116 prior to sending the image content 116 to the user device 108. The filter module 128 applies one or more filters to the image content 116 to create filtered image content 132. As described herein, a filter includes visual effects that may be applied to visual content (e.g., image content 116). Visual effects may change the color, pattern, style, intensity, brightness, gradient, playback speed (e.g., frames per second), playback direction, size and/or shape of the image content 116 or a portion of the image content 116. Further, the visual effects may add additional content to the image content 116. Some examples of filters include a blur effect, a motion blur effect, color effects, distortion effects, stylized effects, composition effects, half-tone effects, transition effects, tile effects, gradient effects, sharpen effects, visual aid effects, translucency effects, overlay effects, privacy effects, augmentation effects, and blur effects. In some instances, filters are applied to modify the image content 116, obfuscate the image content 116 captured within the controlled environment 102, prevent the communication of potentially dangerous information via the image content 116, protect the identity of persons present in the image content 116, protect architectural and/or security details of the controlled environment 102 captured in the image content 116, generate customize versions of the image content 116 based on the user information 122 and/or the inmate information 120, and/or generate more appropriate versions of the image content 116 based on the user information 122 and/or the inmate information 120.

In some embodiments, the content gallery server 112 employs the image analysis module 124 to determine whether the image content 116 includes a face associated with a person other than the inmate 106 and/or the user 110. If the image analysis module 124 determines the image content 116 includes a face associated with a person other than the inmate 106 and the user 110, the content gallery server 112 employs the filter module 128 to apply a filter to the image content 116 that obfuscates the face associated with the person other than the inmate and the user 110.

In some instances, the image analysis module 124 employs facial detection and facial recognition techniques to analyze the faces of the image content 116. For example, the image analysis module 124 detects the presence of one or more faces by analyzing the image content for features and/or attributes indicative of the presence of a face (e.g., features indicative of a mouth, eyes, and/or nose). Additionally, the image analysis module 124 detects facial data points included in the image content 116 at the portions of the image content 116 corresponding to the features indicative of the presence of a face. Further, the image analysis module 124 compares a number of facial data points in the detected facial data with a number of facial data points from the inmate information 120 and the user information 122 using machine learning and/or pattern recognition techniques. Facial data included but is not limited to facial data information representing the characteristics of a person's face such as distances between eyes, nose, and mouth, and shapes of the eyes, nose, mouth, jaw. Facial data also includes facial information created from, for example, a hash function, of the facial data points.

In some other embodiments, the content gallery server 112 employs the filter module 128 to apply a filter to the image content 116 that modifies the background of the image content 116 in order to create the appearance that the inmate 106 is at a location other than the controlled environment 102 based on the user information 122 (e.g., if the user information 122 indicates that the user 110 is young child, the filter may create the appearance that the inmate 106 is at a location more appropriate than the controlled environment 102). In yet still some other embodiments, the content gallery server 112 employs the filter module 128 to apply a filter to the image content 116 that modifies the appearance of the inmate 106 based at least in part on the inmate information 120. For example, the inmate 106 selects one or more filters that modify the clothes worn by the inmate 106 in the image content 116.

As illustrated in FIG. 1, once one or more filters are applied to the image content 116 to generate the filtered image content 132, the content gallery server 112 sends the filtered image content 132 to the user device 108 to be viewed by the user 110. In some embodiments, the content gallery server 112 stores the filtered image content 132 in the content gallery 118 for reuse, thus lessening a processing load of the content gallery server 112 when fulfilling future content requests. Further, the content gallery server 112 can cache the filtered image content 132 for increased efficiency.

Figure 2:
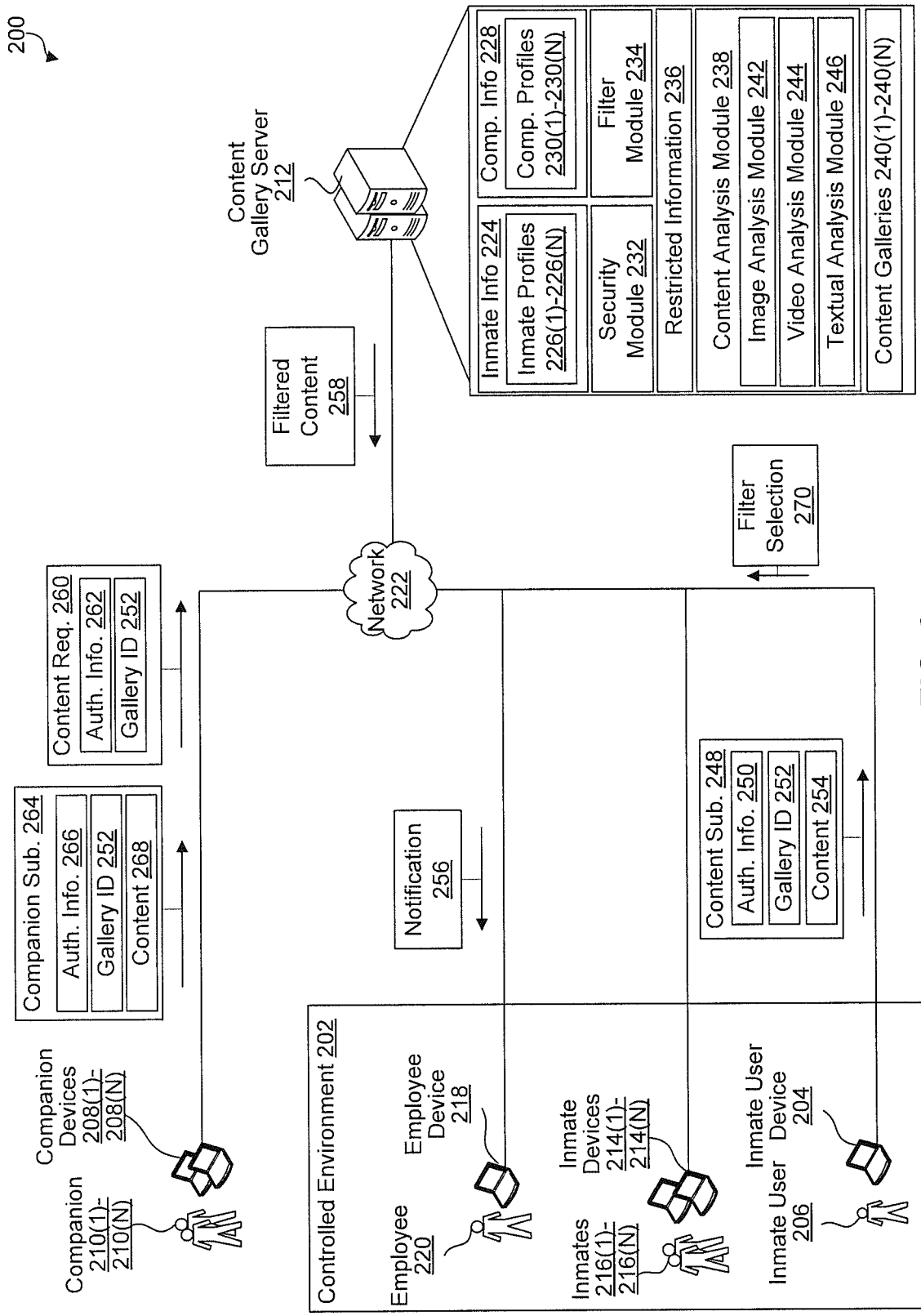
FIG. 2 illustrates a block diagram of an example framework for providing a visual content gallery system in a controlled environment, according to exemplary embodiments.

FIG. 2 illustrates a block diagram of an example framework for providing a visual content gallery 200 in a controlled environment 202, according to an exemplary embodiment. FIG. 2 shows illustrative interactions within the controlled environment 202 between an inmate user device 204 (e.g., inmate device 104) associated with an inmate user 206, companion devices 208 (e.g., user device 108) associated with companions 210 of the inmate user 206, a content gallery server 212, inmate devices 214 (e.g., inmate device 104) associated with inmates 216, and an employee device 218 associated with an employee 220. As illustrated in FIG. 2, the inmate user device 204, the companion devices 208, the content gallery server 212, and the employee device 218 communicate via a communication network(s) 222.

The individual inmates 216 are associated with particular inmate devices 214. For example, a first inmate 216(1) is associated with a first inmate device 214(1), an Nth inmate 216(N) is associated with an Nth inmate device 214(N), and so forth. Further, individual companions 210 are associated with particular companion devices 208. For example, a first companion 210(1) is associated with a first companion device 208(1), an Nth companion 210(N) is associated with an Nth companion device 208(N), and so forth. In some embodiments, a companion is family, friend, or acquaintance of the inmate user 206 and/or one of the inmates 216.

As illustrated in FIG. 2, the content gallery server 212 includes inmate information 224 (e.g., inmate information 120). The inmate information 224 contains inmate profiles 226 corresponding to the inmate user 206 and the inmates 216. For example, the first inmate profile 226(1) is associated with the inmate user 206. The content gallery server 212 further includes companion information 228 (e.g., user information 122). The companion information 228 contains companion profiles 230 corresponding to the companions 210. For example, the first companion profile 230(1) is associated with the first companion 210(1), the Nth companion profile 230(N) is associated with the Nth companion 210(N), and so forth.

Additionally, the content gallery server 212 includes a security module 232, a filter module 234 (e.g., the filter module 128), restricted information 236 (e.g., restricted information 126), a content analysis module 238, and content galleries 240. The security module 232 performs authentication and authorization of the clients (i.e., the inmate user 206, the inmates 216, the employee 220, and the companions 210), and/or the client devices (i.e., the inmate user device 204, the inmate devices 214, the employee devices 218, and the companion devices 208) of the content gallery server 212.

Further, the security module 232 manages authentication information and authorization information for performing authentication and authorization of the clients, respectively. Some examples of authentication information include authentication credentials, user identifiers, device identifiers, passwords, certificates, cookies, tokens, etc. Some examples of authorization information include access control lists (ACLs), client capabilities, client device capabilities, security policy information, etc. In some embodiments, the security module 232 performs encryption and decryption of data transmitted between the content gallery server 212 and the client devices.

The content analysis module 238 analyzes content (e.g., visual content, comments, etc.) submitted by the client devices for prohibited content. Some examples of prohibited content include profanity, vulgarity, slurs, obscenities, nudity, offensive gestures, threats of violence, inappropriate noun usage (e.g., derogatory language about a person, place or thing), etc. Further, prohibited content also includes slang, idioms, gestures, and/or expressions associated with gang activity or illegal activity. Additionally, prohibited content includes images or video including prohibited geographic locations.

The content analysis module 238 includes the image analysis module 242 (e.g., the image analysis module 124), the video analysis module 244, and the textual analysis module 246. The image analysis module 242 analyzes image data for prohibited content. For example, the image analysis module 242 identifies objects included in an image, and determines image features corresponding to the identified objects. In some embodiments, the image analysis module 242 uses machine learning models of the restricted information 236 to perform feature extraction and/or feature detection. Some examples of image features include shape, color, size, style, position, intensity, orientation, etc. Further, the image analysis module 242 compares the features of the identified objects to a blacklist of prohibited image features using machine learning and pattern recognition to determine whether the identified objects constitute prohibited image content.

The video analysis module 244 analyzes video data for prohibited content (e.g., prohibited images, prohibited movements, prohibited audio, prohibited caption text, etc.). For example, the video analysis module 244 identifies objects included in a video frame, and determines image features corresponding to the identified objects. In some embodiments, the image analysis module 244 uses machine learning models of the restricted information 236 to perform feature extraction and/or feature detection. Further, the video analysis module 244 compares the features of the identified objects to a blacklist of prohibited video features using machine learning and pattern recognition to determine whether the identified objects constitute prohibited video content.

As another example, the video analysis module 244 identifies an object in a first frame of video data, and the same object in one or more successive video frames of the video data. Further, the video analysis module 244 determines whether the movement of the object from the first frame to the one or more successive frames constitutes prohibited movement based at least in part on the restricted information 236. As yet another example, the video analysis module 244 extracts audio data from video data, and determines whether the audio data includes prohibited content. In certain embodiments, the video analysis module 244 performs speech recognition analysis on the audio data to generate a transcript of the audio-video content. Further, the textual analysis module 246 determines whether the transcript includes prohibited content. As yet still another example, the video analysis module 244 identifies textual content (e.g., caption text, text overlay, etc.) displayed in the video data.

The textual analysis module 246 analyzes textual data for prohibited content by comparing the textual data to the restricted information 236. For example, the textual analysis module 246 determines whether textual content included in video data or comments associated with video data include prohibited content as represented by the restricted information 236. As described herein, the image analysis module 242, the video analysis module 244, and the textual analysis module 246 may employ each other to determine whether content includes prohibited content.

The content galleries 240 include content information (e.g., image content, comments corresponding to the image content, video content, and comments corresponding to the video content) submitted by the inmate user 206, the inmates 216, and/or the companions 210. In certain embodiments, individual inmates 216 each have an individual content gallery 240. For example, the first content gallery 240(1) is associated with the inmate user 206, and the first content gallery 240(1) includes content submitted by and/or for the inmate user 206.

As illustrated in FIG. 2, the inmate user device 204 sends a content submission 248 to the content gallery server 212. The content submission 248 includes authentication information 250, a content gallery identifier 252, and visual content 254. Upon receipt of the content submission 248, the security module 232 authenticates the inmate user 206 based at least in part on the authentication information 250. In some embodiments, the authentication information 250 includes an inmate user identifier and a credential. Further, the security module 232 authenticates the inmate user 206 based on comparing the credential to credential information stored in the inmate profile 226(1) associated with the inmate user 206 and/or other information accessible to the security module 232. In some instances, the credential can include password information associated with the inmate user 206. In some other instances, the credential can include information (e.g., authentication cookie, authentication token, etc.) representing that the inmate user 206 and/or inmate user device 204 has been previously authenticated by the security module 232. In certain embodiments, the content gallery server 212 sends a notification 256 to the employee device 218 in response to a failed authentication attempt.

Once the security module 232 authenticates the inmate user 206, the security module 232 further determines whether the inmate user 206 is authorized to add the visual content 254 to the content gallery 240(1) corresponding to the content gallery identifier 252. In some embodiments, the security module 232 determines whether an access control list indicates that the inmate user 206 write access permissions to the content gallery 240(1) corresponding to the content gallery identifier 252. In certain embodiments, the content gallery server 212 sends the notification 256 to the employee device 218 in response to a failed authorization attempt.

After successful authentication and authorization, the content analysis module 238 determines whether the visual content 254 contains inappropriate content that renders the visual content 254 inappropriate for inclusion in the content gallery 240(1) corresponding to the content gallery identifier 252. For example, the content analysis module 238 employs the video analysis module 244 to determine whether the visual content 254 includes prohibited content. If the content analysis module 238 determines that the visual content 254 does not include prohibited content, the content gallery server 212 adds the visual content 254 to the content gallery 240(1). In certain embodiments, the content gallery server 212 sends the notification 256 to the employee device 218 in response to the detection of prohibited content. Further, the security module 232 may modify the privileges and/or access rights of the inmate user 206 in response to an attempt to submit visual content 254 including prohibited content. For example, the security module 232 may temporarily suspend the content gallery 240(1) of the inmate user 206 for a predetermined period of time.

Once the visual content 254 is stored in the content gallery 240(1), the companions 210 and/or the inmates 216 can request to view the visual content 254 within the content gallery 240(1). As illustrated in FIG. 2, the companion device 208(1) sends a content request 260 to the content gallery server 212 indicating that the companion 210(1) would like to view the content gallery 240(1). The content request 260 includes authentication information 262 and a content gallery identifier 252. Upon receipt of the content request 260, the security module 232 authenticates the companion 210(1) and/or the companion device 208(1).

In some embodiments, the authentication information 262 includes a companion identifier and a credential. Further, the security module 232 authenticates the companion 210(1) based on comparing the credential to credential information stored in the companion profile 230(1) associated with the companion 210(1) and/or other information accessible to the security module 232. In some instances, the credential can include password information associated with the companion 210(1). In some other instances, the credential can include information (e.g., authentication cookie, authentication token, etc.) representing that the companion 210(1) and/or companion device 208(1) has been previously authenticated by the security module 232. In certain embodiments, the content gallery server 212 sends the notification 256 to the employee device 218 in response to a failed authentication attempt.

Further, the security module 232 determines whether the companion 210(1) and/or companion device 208(1) is authorized to view the content gallery 240(1) and/or the visual content 254. For instance, the security module 232 determines whether the companion 210(1) and/or companion device 208(1) is permitted to view the visual content 254 based on at least one of authorization information included in the inmate profile 226(1) associated with the content gallery 240(1), authorization information included in the companion profile 230(1) associated with the companion 210(1), or authorization information maintained by the security module 232. Further, the administration of the controlled environment 202 may manage the authorization information to ensure that access to the content galleries 240 is monitored, logged, and/or audited. In certain embodiments, the content gallery server 212 sends the notification 256 to the employee device 218 in response to a failed authorization attempt of the companion 210(1) and/or companion device 208(1).

Further, the content gallery server 212 further determines whether any filters should be applied to the visual content 254 prior to sending the visual content 254 to the companion device 208(1). In some embodiments, the filter module 234 applies filters selected by the inmate user 206 or the companion 210(1). Additionally, or alternatively, the inmate user 206 may use an application on the inmate user device 204 to apply a filter to the visual content 254 before sending the content submission 248 to the content gallery server 212. For example, the inmate user 206 may select the application of a filter that modifies a background of the visual content 254. For instance, the inmate user 206 may select a filter that replaces or obfuscates the background of the visual content 254. As another example, the inmate user 206 may select the application of a filter that modifies a clothing item of the inmate user 206 within the visual content 254.

In some embodiments, the filter module 234 applies filters configured by the administration of the controlled environment 202. For example, the administration may endeavor to prevent an inmate user 206 from using the content gallery server 212 to communicate that another inmate 216 is an acquaintance or adversary. As such, the administration may configure the filter module 234 to obfuscate faces other than the face of the inmate user 206 captured in the visual content 254. As another example, the administration may endeavor to prevent an inmate user 206 from using the content gallery server 212 to communicate the identity of the employee 220. As such, the administration may configure the filter module 234 to obfuscate the face of the employee 220 captured in the visual content 254.

In some embodiments, the administration configures the filter module 234 to apply one or more filters based at least in part on attributes of the inmate user 206 and/or client requesting to view the content gallery 240(1). For example, when the visual content 254 is sent to companions 210 below a predetermined age threshold, the filter module 234 applies filters that mask that the inmate user 206 is currently confined to the controlled environment 202. As another example, when the visual content 254 is sent to other inmates 216, the filter module 234 applies filters that obfuscate the faces of non-inmates. Further, the attributes of the inmate user 206 and/or entity requesting to view the content gallery 240(1) is determined based at least in part on inmate information 226 or companion information 230.

Once the filter module 234 identifies the filters to apply to the content, the filter module 234 applies the identified filters to the visual content 254 to create filtered content 258. Further, the filtered content 258 is sent to the companion device 208(1). Similarly, the inmate devices 214 and/or the employee devices 218 may send a content request (e.g., content request 260), and receive filtered content (e.g., filtered content 258) upon successful authentication and authorization.

As illustrated in FIG. 2, the companion device 208(1) sends a companion submission 264 to the content gallery server 212. The companion submission 264 includes authentication information 266, a content gallery identifier 252, and companion content 268. In some embodiments, the companion content 268 includes a comment corresponding to the filtered content 258 of the content gallery 240(1) corresponding to the content gallery identifier 252. In some other embodiments, the companion content 268 includes visual content (e.g., visual content 254) to add to the content gallery 240(1) corresponding to the content gallery identifier 252.

Upon receipt of the companion submission 264, the security module 232 authenticates the companion 210 based at least in part on the authentication information 266. In some embodiments, the authentication information 266 includes a companion identifier and a credential. Further, the security module 232 authenticates the companion 210 based on comparing the credential to credential information stored in the companion profile 230(1) associated with the companion 210(1) and/or other information accessible to the security module 232. In some instances, the credential can include password information associated with the companion 211(1). In some other instances, the credential can include information (e.g., authentication cookie, authentication token, etc.) representing that the companion 210(1) and/or companion device 208(1) has been previously authenticated by the security module 232. In certain embodiments, the content gallery server 212 sends the notification 256 to the employee device 218 in response to a failed authentication attempt.

Once the security module 232 authenticates the companion 210(1) and/or the companion device 208(1), the security module 232 further determines whether the companion 210 is authorized to add the companion content 268 to the content gallery 240(1) corresponding to the content gallery identifier 252. In some embodiments, the security module 232 determines whether an access control list indicates that the companion 210(1) and/or companion device 208(1) has write access rights over the content gallery 240(1). In certain embodiments, the content gallery server 212 sends the notification 256 to the employee device 218 in response to a failed authorization attempt.

After successful authentication and authorization, the content analysis module 238 determines whether the companion content 268 contains inappropriate content that renders the companion content 268 inappropriate for inclusion in the content gallery 240(1) corresponding to the content gallery identifier 252. For example, suppose the companion content 268 is a text comment, the content analysis module 238 employs the textual analysis module 246 to determine whether the text comment 268 includes prohibited content. If the content analysis module 238 determines that the companion content 268 does not include prohibited content, the content gallery server 212 adds the companion content 268 to the content gallery 240(1). For example, the content gallery server 212 associates the comment 268 to the visual content 254 of the content gallery 240(1). As another example, the content gallery adds the companion content 268 to the content gallery 240(1). Once the companion content 268 has been added to the content gallery 240(1), the companion content 268 may be requested and received by client devices authorized to view the content and/or comments of the content gallery 240(1). Further, the security module 232 may modify the privileges and/or access rights of the companion 210(1) in response to an attempt to submit companion content 268 that includes prohibited content. For example, the security module 232 may temporarily suspend the companion 208(1) from using the visual content gallery 200 for a predetermined period of time.

As illustrated in the FIG. 2, the inmate user device 204 sends a filter selection 270 to the content gallery server 212. The filter selection 270 indicates one or more filters the inmate user 206 would like to apply to the content of the content gallery 240(1). In some embodiments, the inmate user 206 sets the filter based at least in part on an attribute of the content of the content gallery 240(1), an attribute of a client (e.g., age, location, etc.) requesting to view the content of the content gallery 240(1), and a type of client (e.g., family, friend, etc.) requesting to view the content of the content gallery 240(1). For example, the filter selection 270 can indicate that the inmate user 206 would like the filter module 234 to apply one or more filters (e.g., face obfuscation of one or more faces of the content, modification of a background of the visual content 254, etc.) when the visual content 254 is requested by companion devices 208 associated with family members.

Figure 3B:
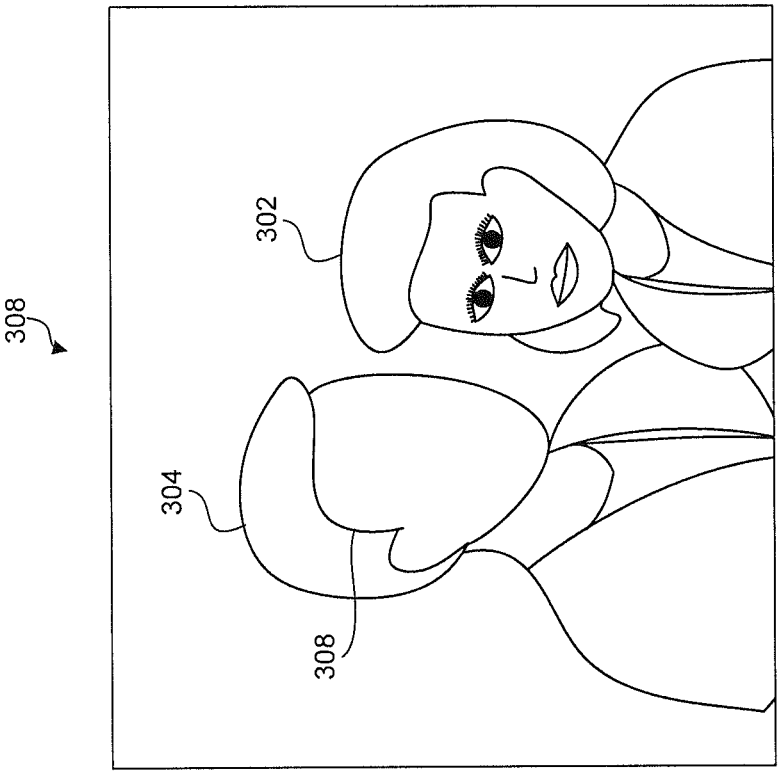
FIGS. 3A-3B illustrate an example application of a graphical filter, according to exemplary embodiments.
Figure 3A:
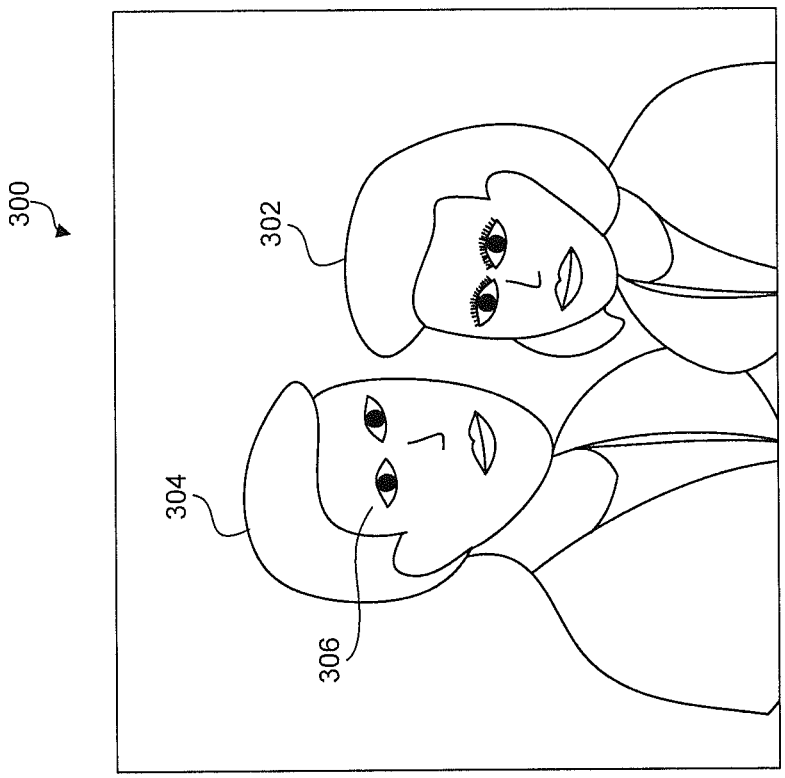

FIGS. 3A-3B illustrate an example application of a filter to visual content 300, according to exemplary embodiments. FIG. 3A illustrates visual content 300 that includes an inmate user 302, and a companion 304 of the inmate user 302. As shown in FIG. 3A, the visual content 300 includes the face 306 of the companion 304. FIG. 3B illustrates filtered visual content 308 associated with the visual content 300. In particular, the filtered visual content 308 represents application of a filter that obfuscates the face 306 of the companion 304 to produce an obfuscated face 310 in the filtered visual content 308. In some embodiments, a filter module (e.g., the filter module 128 or the filter module 234) obfuscates the face 306 of the companion 304 to protect the identity of the companion 304. For instance, the companion 304 may be a friend or family member of the inmate user 302, and the client requesting the visual content 300 may not be authorized to view content including family and friends of the inmate user 302. In some other embodiments, the filter module obfuscates a portion of the visual content 300 in order to mask potentially prohibited content. For instance, the content analysis module (e.g., the content analysis module 238) may not be able to conclusively determine whether a portion of the visual content 300 contains prohibited content. As a result, the filter module obfuscates the portion of the visual content 300 potentially containing prohibited content.

Figure 4B:
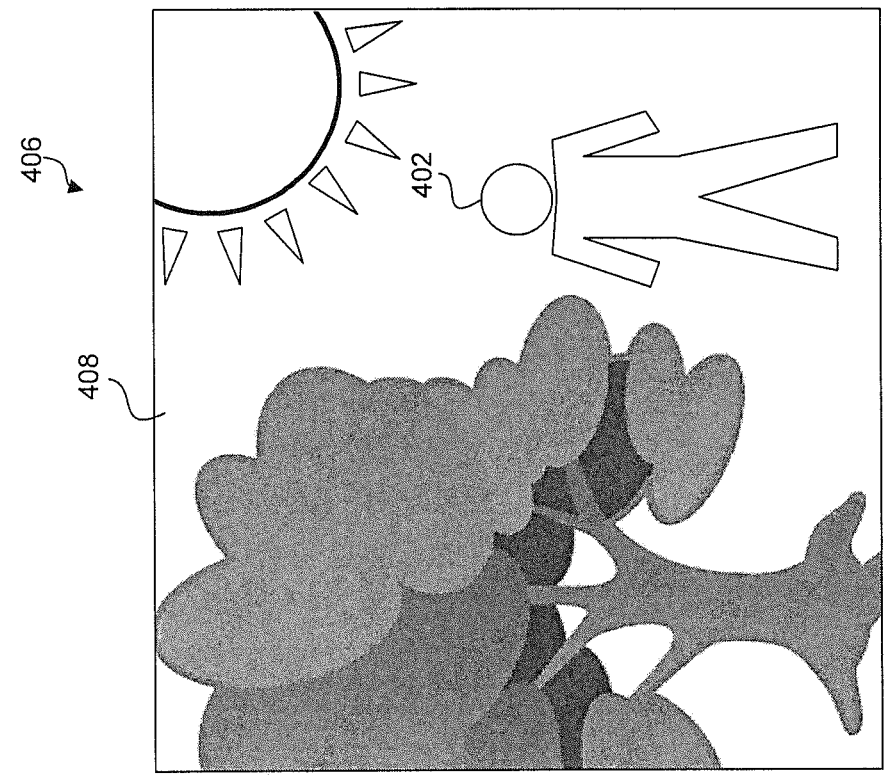
FIG. 4A-4B illustrate an example application of a graphical filter, according to exemplary embodiments.
Figure 4A:
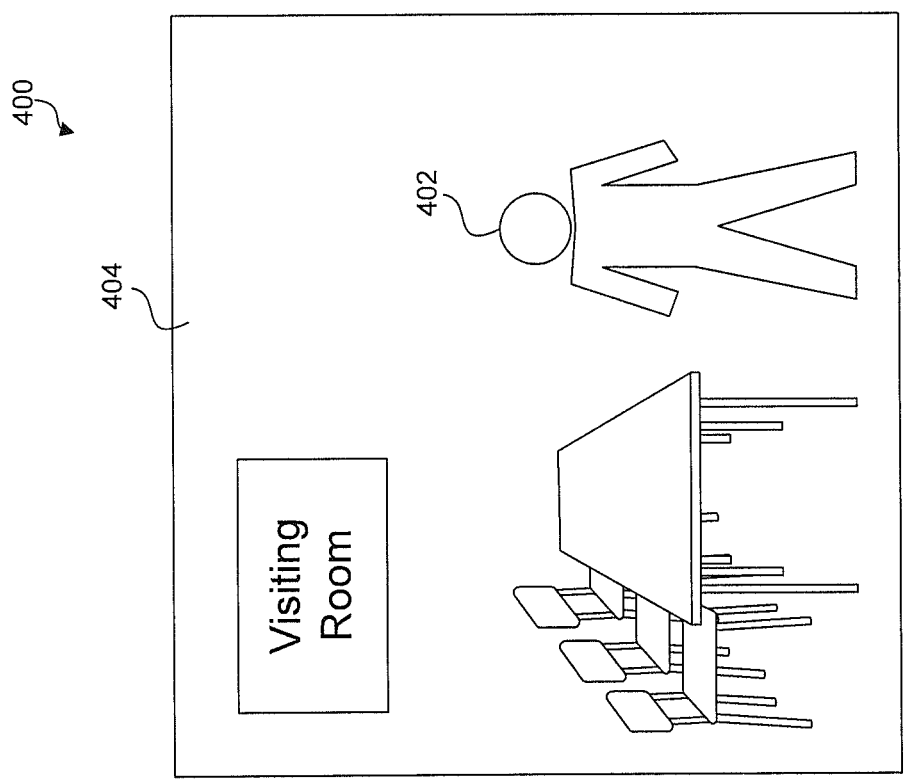

FIG. 4A-4B illustrate an example application of a filter to visual content, according to exemplary embodiments. FIG. 4A illustrates visual content 400 that includes an inmate user 402 and a background 404 within a controlled environment (e.g., the controlled environment 102 or the controlled environment 202). As shown in FIG. 4A, the background 404 includes visual content that indicates that the inmate user 402 is located within the controlled environment. FIG. 4B illustrates filtered visual content 406 associated with the visual content 400. In particular, the filtered content 406 represents application of a filter that replaces the background 404 of the visual content 400 to produce filtered content 406 with a modified background 408. In some embodiments, a filter module (e.g., the filter module 128 or the filter module 234) replaces the background 404 of the visual content 400 to mask that the inmate user 402 is currently confined to a controlled environment. In some other embodiments, the filter module replaces the background 404 in order to change a theme, mood, and/or style of the visual content 400. Further, a client of the visual content gallery (e.g., the inmate user 402) may select the modified background 408 from among a plurality of available backgrounds. Additionally, or alternatively, the filter module may replace only a portion of the visual content 400 to generate the filtered content 406.

In some embodiments, the filter module replaces the background 404 of the visual content 400 based at least in part on an attribute of the inmate user 402 and/or an attribute of a client requesting to view the visual content 400. For example, the filter module can replace the background 404 of the visual content 400 when the requesting client is a young child. As another example, the filter module can replace the background 404 of the visual content 400 with a modified background 408 associated with a favorite destination of the inmate user 402 and/or the requesting client.

Figure 5B:
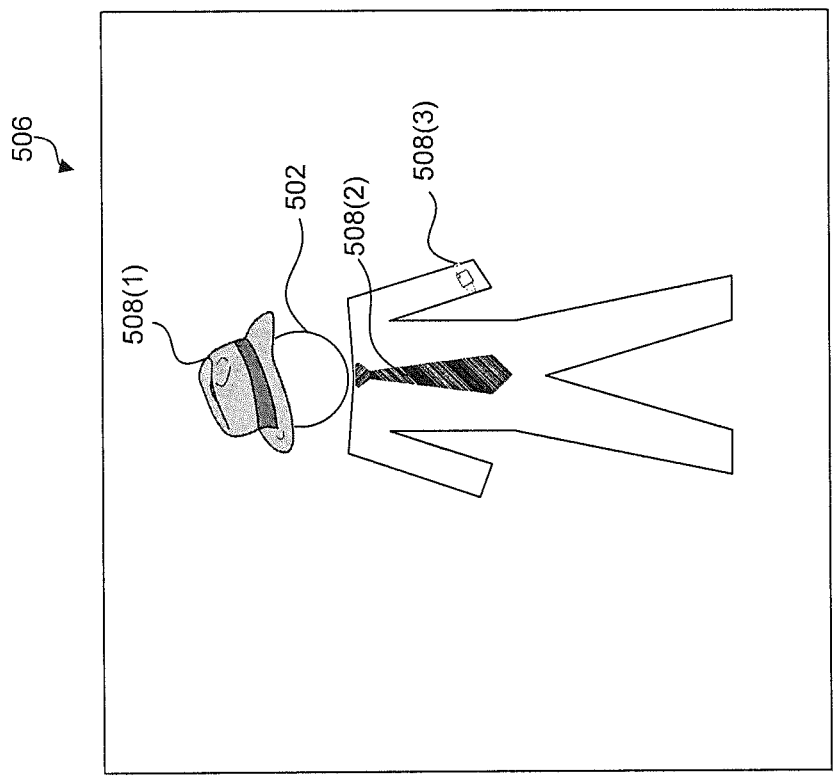
FIG. 5A-5B illustrate an example application of a graphical filter, according to exemplary embodiments.
Figure 5A:
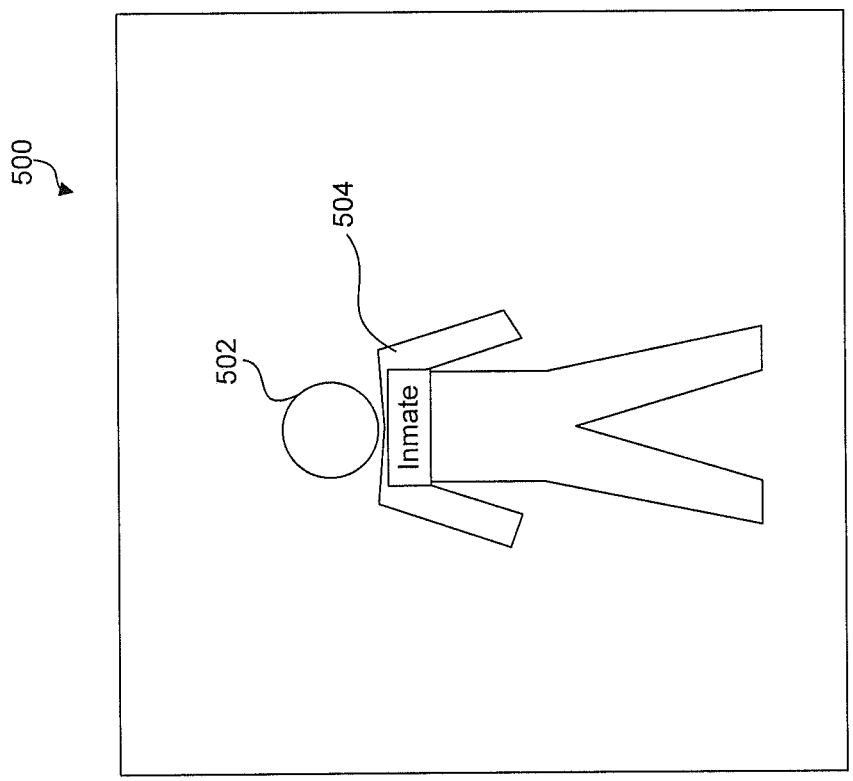

FIG. 5A-5B illustrate an example application of a filter to visual content, according to exemplary embodiments. FIG. 5A illustrates visual content 500 that includes an inmate user 502. As shown in FIG. 5A, an outfit 504 of the inmate user 502 reveals that the inmate user 502 is currently housed within a controlled environment (e.g., the controlled environment 102 or the controlled environment 202). FIG. 5B illustrates filtered visual content 506 associated with the visual content 500. In particular, the filtered content 506 represents application of a filter that replaces the outfit 504 of the inmate user 502 to produce filtered content 506 that shows the inmate user 502 wearing modified outfit items 508 (i.e., a hat 508(1), a tie 508(2), and a watch 508(3)). In some embodiments, the inmate user 502 and/or a requesting client selects the modified outfit items 508. Additionally, or alternatively, the filter module apply may select the modified outfit items based upon at least inmate information (e.g., the inmate information 120 or the inmate information 224), and/or companion information (e.g., the user information 122 or the companion information 228).

Figure 6:
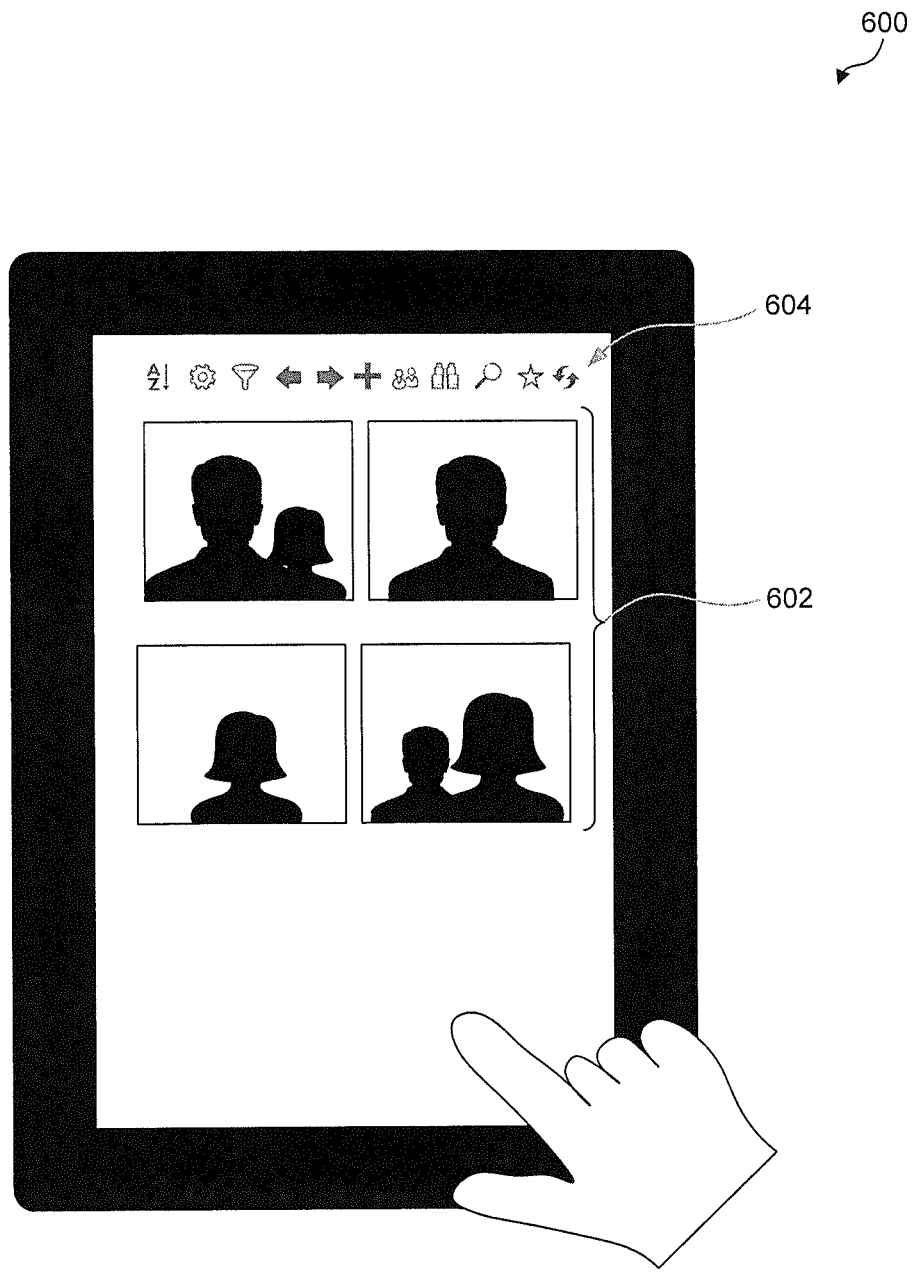
FIG. 6 illustrates an example graphical user interface for providing a visual content gallery application in a controlled environment, according to exemplary embodiments.

FIG. 6 illustrates an example graphical user interface 600 for providing a visual content gallery application associated with a controlled environment, according to exemplary embodiments.

FIG. 6 illustrates a graphic layout (e.g., grid layout) of visual content 602 included in a visual content gallery (e.g., content gallery 118 or content galleries 240(1)-(N)). Further, the graphical user interface 600 includes a plurality of controls 604 for interacting with the visual content 602 and/or the visual content gallery. Some example functionalities of the plurality of controls 604 include sorting the visual content 602, setting configuration attributes of the visual content and/or visual content gallery, filtering the visual content 602 displayed in the graphical user interface 600, navigating the visual content 602 of the visual content gallery, adding or removing visual content to the visual content gallery via a video capture functionality or image capture a functionality, viewing content associated with other clients of the visual content gallery server (e.g., the content gallery server 112 or the content gallery server 212), searching the visual content 602 of the visual content gallery, bookmarking the visual content 602, viewing visual content 602 that has been bookmarked, selecting graphical filters to apply to visual content to the visual content gallery, and/or refreshing the visual content 602 available to be displayed via the graphical user interface 600. Additionally, or alternatively, the graphical user interface 600 accepts touch input and/or touch gestures to accomplish the functionalities of the plurality of controls 604.

Figure 7:
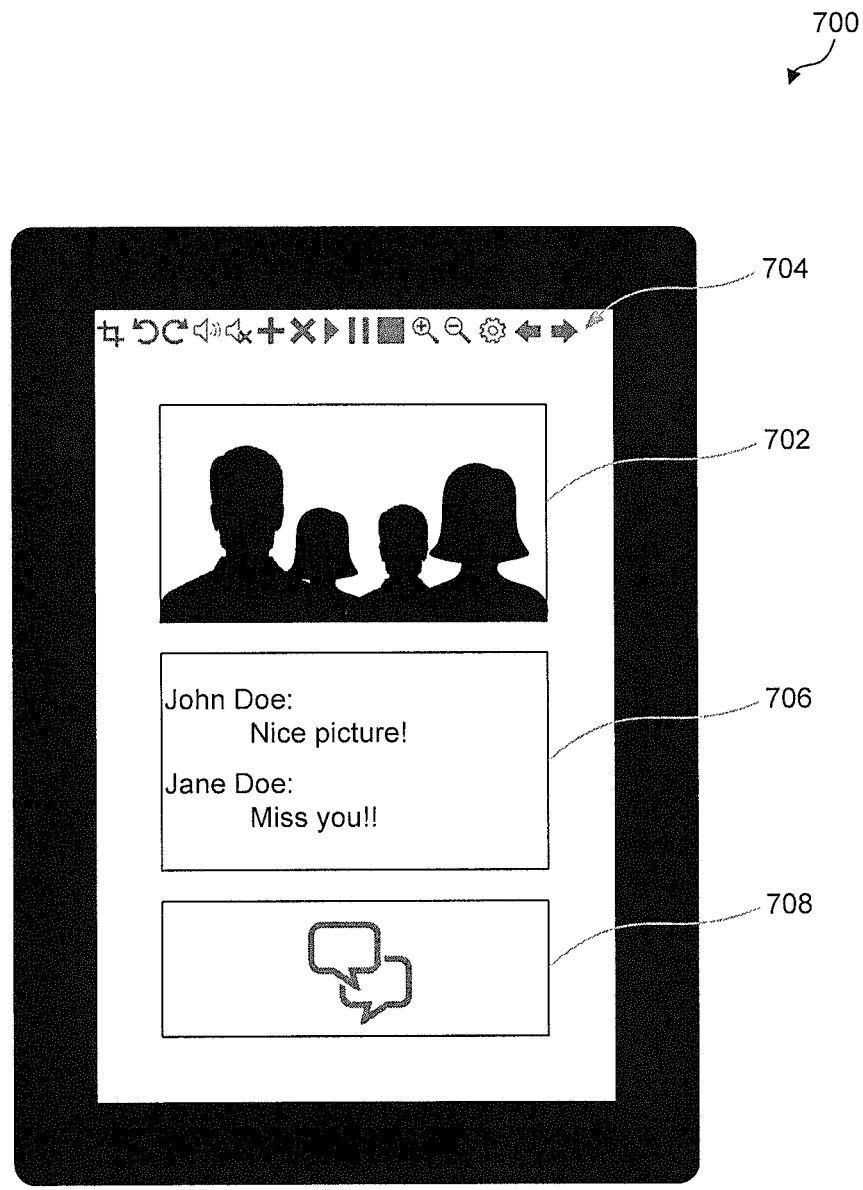
FIG. 7 illustrates an example graphical user interface for providing a visual content gallery application in a controlled environment, according to exemplary embodiments.

FIG. 7 illustrates an example graphical user interface 700 for providing a visual content gallery application associated with a controlled environment, according to exemplary embodiments.

FIG. 7 illustrates visual content 702 included in a visual content gallery (e.g., content gallery 118 or content galleries 240(1)-(N)). Further, the graphical user interface 700 includes a plurality of controls 704 for interacting with the visual content 702. Some example functionalities of the plurality of controls 704 include modifying (e.g., cropping, rotating, marking up, labeling, editing, etc.) the visual content 702, selecting a filter to apply to the visual content 702, modifying the playback volume of the visual content 702, modifying the playback speed of the visual content 702, adding another item of visual content to the visual content 702 to create a playlist or slideshow, playback controls for the visual content 702, zoom controls for the visual content 702, setting configuration attributes of the visual content 702, and navigating the visual content 702 of the visual content gallery. Additionally, or alternatively, the graphical user interface 700 accepts touch input and/or touch gestures to accomplish the functionalities of the plurality of controls 704.

Further, the graphical user interface 700 includes a comment display area 706 that displays comments associated with the visual content 702. As described above in detail, clients of the visual content gallery server (e.g., the content gallery server 112 or the content gallery server 212) submit the comments displayed in the comment display area 706. In addition, the graphical user interface 700 includes a comment submission area 708. The comment submission area 708 provides a graphical user interface for submitting comments to the visual content gallery server. In some embodiments, comments submitted via the content submission area 708 are displayed in the comment display area 706 after the comments have been approved by the visual content gallery server.

Figure 8:
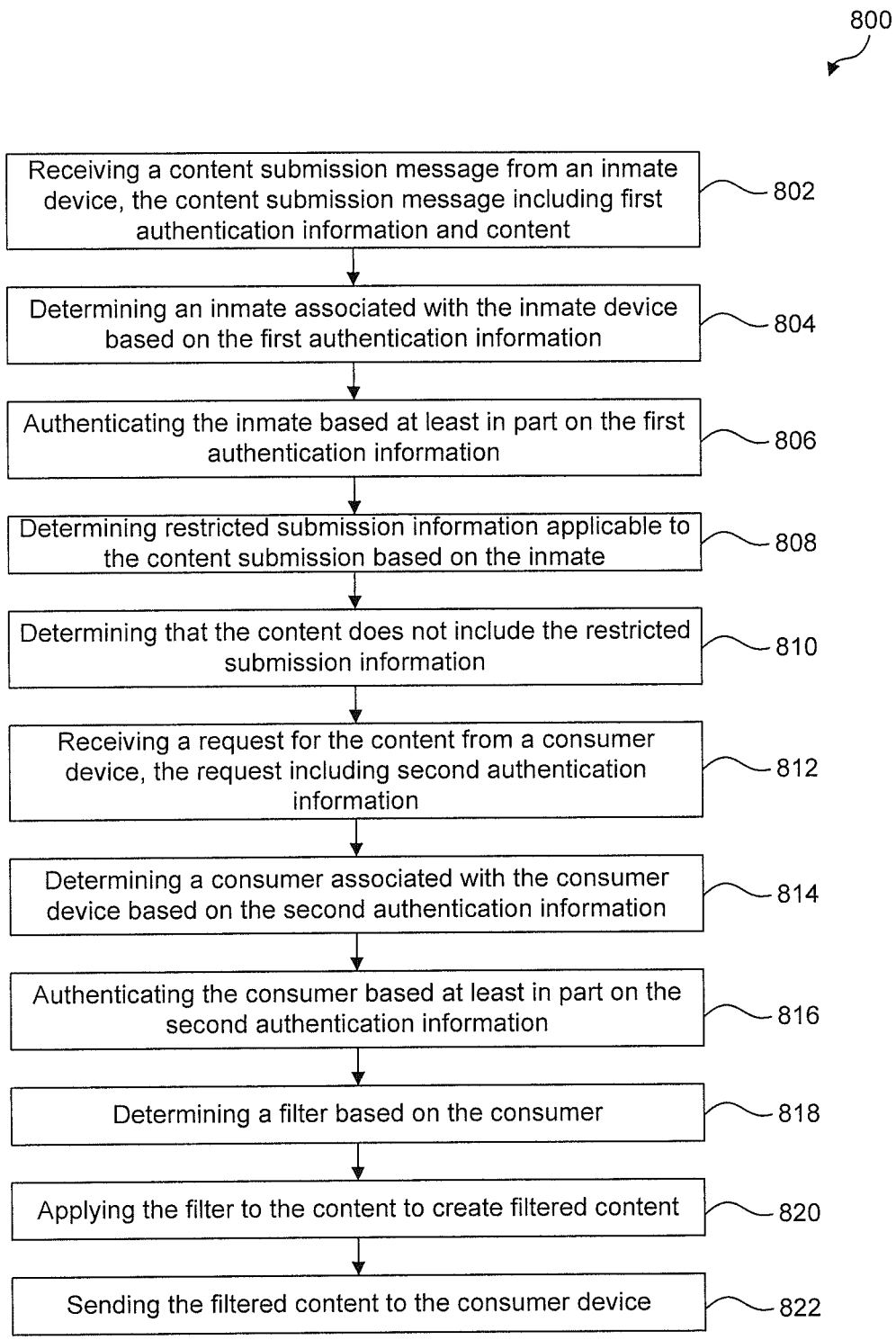
FIG. 8 is a flowchart diagram illustrating an example process for managing visual content within a controlled environment according to exemplary embodiments.

FIG. 8 is a flowchart diagram illustrating an example process for managing visual content within a controlled environment according to exemplary embodiments.

At 802, the content gallery server receives a content submission message from an inmate device, the content submission message including first authentication information and content. For example, the content gallery server 212 receives the content submission 248 from the inmate user device 204 via the network 222. Further, the content submission 248 includes the authentication information 250 and the visual content 254. In some embodiments, the content submission 248 further includes the gallery identifier 252 that identifies the content gallery 240(1) that will contain the visual content 254.

At 804, the content gallery server determines an inmate associated with the inmate device based on the first authentication information. For example, the security module 232 determines that the inmate user 206 has submitted the content submission 248 based on the authentication information 250. In some embodiments, the authentication information 250 includes a user identifier and a password. Additionally, or alternatively, the authentication information 250 includes a device identifier associated with the inmate device 204. Further, the content gallery server 212 determines the inmate 206 associated with the inmate device 204 based on the profile information 226(1) indicating that the inmate 206 is in currently possession of the inmate device 204.

At 806, the content gallery server authenticates the inmate based at least in part on the first authentication information. For example, the security module 232 may authenticate the inmate user 206 or the inmate user device 204 based at least in part on the authentication information 250. In some embodiments, the security module 232 matches that a user identifier and password included in the authentication information 250 matches stored authentication information associated with the inmate user 206. Further, the inmate profile 226(1) associated with the inmate user 206 can include the stored authentication information.

At 808, the content gallery server determines restricted information based on the inmate. For example, the content gallery server 212 determines a portion of the restricted information 236 particular to the inmate user 206. In some embodiments, the content gallery server 212 determines the portion of the restricted information 236 particular to the inmate user 206 based at least in part on the inmate profile 226(1) corresponding to the inmate user 206. For instance, the inmate profile 226(1) may indicate a criminal organization associated with the inmate user 206. As a result, the content gallery server 212 identifies restricted information 236 particular to the criminal organization.

At 810, the content gallery server determines that the content does not include the restricted information. For example, the content analysis module 238 analyzes the visual content 254 of the content submission 248. As an example, the content analysis module 238 determines that the visual content 254 does not include one or more hand gestures associated with a criminal organization associated with the inmate user 206. In certain embodiments, the content analysis module 238 employs machine learning and/or pattern recognition techniques to determine whether the visual content 254 includes portions of the restricted information 236. As another example, the content analysis module 238 determines that the visual content 254 does not include content associated with a prohibited geographic location. For instance, the content analysis module 238 determines that metadata associated with the visual content 258 does not indicate that the visual content 258 was captured at a prohibited location. Further, the content analysis module 238 determines that the visual content 258 does not include visual objects (e.g., street signs, buildings, landmarks, etc.) corresponding to a prohibited location.

At 812, the content gallery server receives a request for the content from a consumer device, the request including second authentication information. For example, the companion device 208(1) sends the content request 260 to the content gallery server 212. The content request 260 includes the authentication information 262. Further, the content request includes a gallery identifier 252 associated with the content gallery 240(1). In some embodiments, the gallery identifier 252 indicates the content gallery 240(1) that includes the content being requested.

At 814, the content gallery server determines a consumer associated with the consumer device based on the second authentication information. For example, the security module 232 determines that the companion 210 has submitted the content request 260 based on the authentication information 262. In some embodiments, the authentication information 262 includes a user identifier and a password.

At 816, the content gallery server authenticates the consumer based at least in part on the second authentication information. For example, the security module 232 may authenticate the companion 210(1) or the companion device 208(1) based at least in part on the authentication information 262. In some embodiments, the security module 232 matches that a user identifier and password included in the authentication information 262 matches stored authentication information associated with the companion 210(1). Further, the companion profile 230(1) associated with the companion 210(1) can include the stored authentication information.

At 818, the content gallery server determines a filter based on the consumer. For example, the content gallery server 212 determines that the companion 210(1) is a child of the inmate user 206 based at least on at least one of the inmate profile 226(1) or the companion profile 230(1). As a result, the content gallery server 212 identifies one or more filters to apply to visual content based on the companion 210(1) being a child. In some embodiments, the applicable filters are configured by the employees 220. Additionally, or alternatively, the inmate user 206 may set the filters to be applied to the visual content 254 based on an attribute of the requesting client.

At 820, the content gallery server applies the filter to the content to create filtered content. For example, once the content gallery server 212 determines that the companion 210(1) is a child of the inmate user 206, the content gallery server 212 applies a filter to the visual content 254 that modifies the background of the visual content 254 to generate the filtered content 258.

At 822, the content gallery server sends the filtered content to the consumer device. For example, the content gallery server 212 sends the filtered content 258 to the companion device 210(1).

Figure 9:
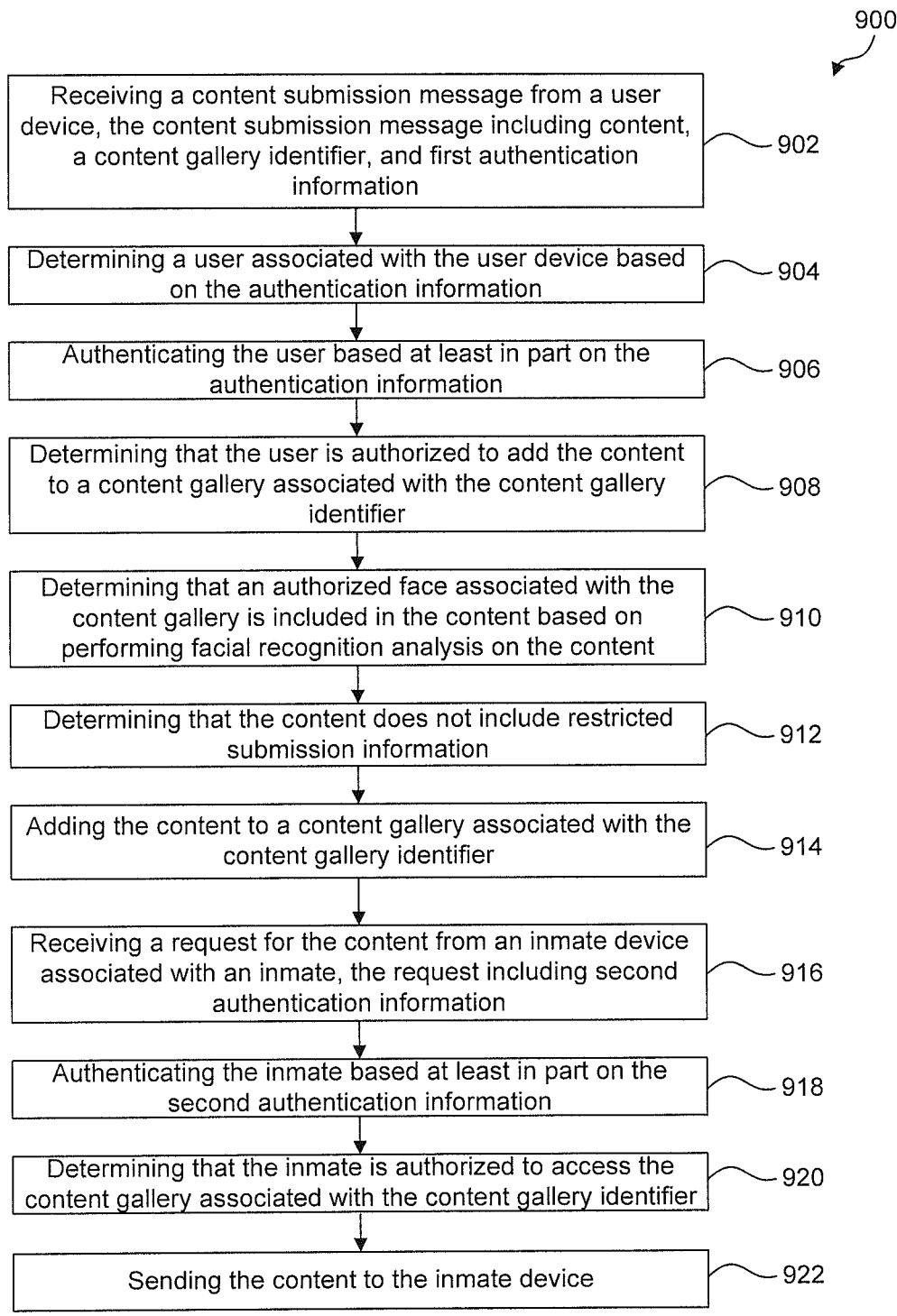
FIG. 9 is a flowchart diagram illustrating an example process for managing visual content within a controlled environment according to exemplary embodiments.

FIG. 9 is a flowchart diagram illustrating an example process for managing visual content within a controlled environment according to exemplary embodiments.

At 902, the content gallery server receives a content submission message from a user device, the content submission message including content, a content gallery identifier, and first authentication information. For example, the companion 210 sends the companion submission 264 to the content gallery server 212. The companion submission 264 includes the authentication information 266, the gallery identifier 252, and the companion content 268. In some embodiments, the gallery identifier 252 further identifies a portion of the content gallery 240(1).

At 904, the content gallery server determines a user associated with the user device based on the authentication information. For example, the security module 232 determines that the companion 210 has submitted the companion submission 264 based on the authentication information 266. In some embodiments, the authentication information 266 includes a user identifier and a password.

At 906, the content gallery server authenticates the user based at least in part on the authentication information. For example, the security module 232 may authenticate the companion 210(1) or the companion device 208(1) based at least in part on the authentication information 266. In some embodiments, the security module 232 matches that a user identifier and password included in the authentication information 266 matches stored authentication information associated with the companion 210(1). Further, the companion profile 230(1) associated with the companion 210(1) can include the stored authentication information.

At 908, the content gallery server determines that the user is authorized to add the content to a content gallery associated with the content gallery identifier. For example, the security module 232 determines that the companion 210(1) is authorized to add the companion content 268 to the content gallery 240(1) associated with the content gallery identifier 252. As another example, the security module 232 determines that the companion 210(1) is authorized to comment on the visual content 254 of the content gallery 240(1).

At 910, the content gallery server determines that an authorized face associated with the content gallery is included in the content based on performing facial recognition analysis on the content. For example, the image analysis module 242 determines that a face associated with the companion 210(1) is included in the companion content 268 based on performing facial recognition techniques on the companion content 268. Further, the image analysis module 242 determines that the companion 210(1) is authorized to be captured in content of the content player 240(1). In some embodiments, information corresponding to the face of the companion 210(1) is stored in the companion profile 230(1) associated with the companion 210(1). Further, the information indicating the companions 210 authorized to be captured in the content of a content gallery can be included in the companion information 228, and/or the inmate information 224.

In some other embodiments, the image analysis module 242 dete mines that there aren't any unauthorized faces included in the companion content 268 based on performing facial recognition techniques on the companion content 268. For example, the image analysis module 242 determines that there aren't any faces captured in content of 240(1). In yet still some other embodiments, the image analysis module 242 determines that there is at least one authorized face included in the companion content 268 based on performing facial recognition techniques on the companion content 268. For example, the image analysis module 242 determines that a face associated with the companion 210(1) is included in the companion content 268 based on performing facial recognition techniques on the companion content 268. Further, the image analysis module 242 determines that the companion 210(1) is authorized to be captured in content of the content player 240(1).

At 912, the content gallery server determines that the content does not include restricted information. For example, the content analysis module 238 analyzes the companion content 268 of the companion submission 264. As an example, the content analysis module 238 determines that the companion content 268 does not include text captions associated with violence or illegal activity. In certain embodiments, the content analysis module 238 employs machine learning techniques to determine whether the companion content 268 includes portions of the restricted information 236.

In some examples, the content gallery server 212 determines a portion of the restricted information 236 particular to the companion 210(1). For instance, the content gallery server 212 determines a portion of the restricted information 236 particular to the companion 210(1) based at least in part on the inmate profile 226(1) corresponding to the inmate user 206, and/or the companion profile 230(1) corresponding to the companion 210(1). For instance, the inmate profile 226(1) may indicate a criminal organization associated with the inmate user 206. As a result, the content gallery server 212 determines that the companion content 238 does not include restricted information 236 particular to the criminal organization.

At 914, the content gallery server adds the content to a content gallery associated with the content gallery identifier. For example, the content gallery server 212 adds the companion content 268 to the content gallery 240(1) associated with the content gallery identifier 252. As another example, the content gallery server 212 adds the companion content 268 to the content gallery 240(1).

At 916, the content gallery server receives a request for the content from an inmate device associated with an inmate, the request including second authentication information. For example, the content gallery server 212 may receive a content request (e.g., content request 260) from the inmate user device 204 via the network 222. Further, the content request includes the authentication information 250.

At 918, the content gallery server authenticates the inmate based at least in part on the second authentication information. For example, the security module 232 may authenticate the inmate user 206 or the inmate user device 204 based at least in part on the authentication information 250. In some embodiments, the security module 232 matches that a user identifier and password included in the authentication information 250 matches stored authentication information associated with the inmate user 206. Further, the inmate profile 226(1) associated with the inmate user 206 can include the stored authentication information.

At 920, the content gallery server determines that the inmate is authorized to access the content gallery associated with the content gallery identifier. For example, the security module 232 determines that the inmate user 206 and/or the inmate device 204 are authorized to access the companion content 268 from within the content gallery 240(1).

At 922, the content gallery server sends the content to the inmate device. For example, the content gallery server 212 sends the companion content 268 to the inmate user device 204.

Figure 10:
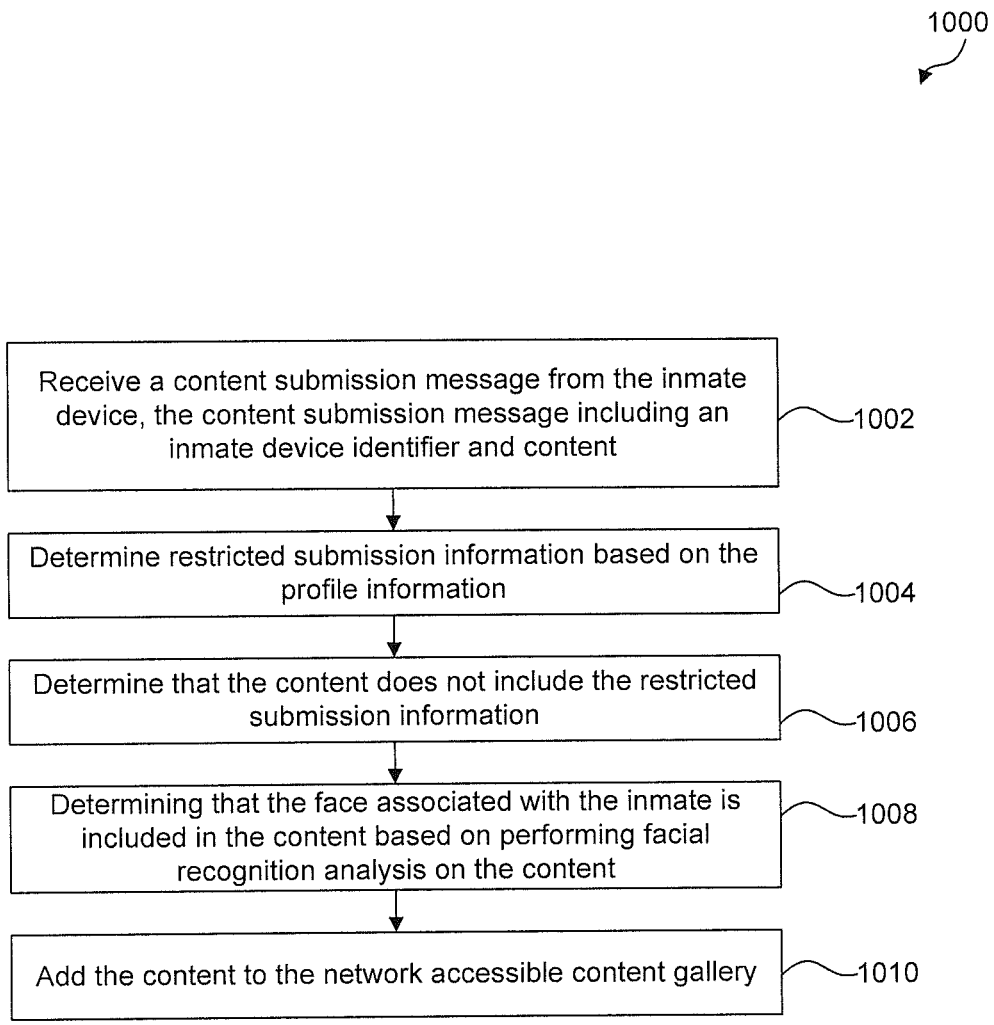
FIG. 10 is a flowchart diagram illustrating an example process for managing visual content within a controlled environment according to exemplary embodiments.

FIG. 10 is a flowchart diagram illustrating an example process for managing visual content within a controlled environment according to exemplary embodiments.

At 1002, the content gallery server receives a content submission message from the inmate device, the content submission message including authentication information and content. For example, the content gallery server 212 receives the content submission 248 from the inmate user device 204 via the network 222. Further, the content submission 248 includes the authentication information 250 and the visual content 254. In some embodiments, the content submission 248 further includes the gallery identifier 252 that identifies the content gallery 240(1) that will contain the visual content 254.

At 1004, the content gallery server determines restricted information based on the profile information. For example, the content gallery server 212 determines a portion of the restricted information 236 particular to the inmate user 206. In some embodiments, the content gallery server 212 determines the portion of the restricted information 236 particular to the inmate user 206 based at least in part on the inmate profile 226(1) corresponding to the inmate user 206. For instance, the inmate profile 226(1) may indicate a criminal organization associated with the inmate user 206. As a result, the content gallery server 212 identifies restricted information 236 particular to the criminal organization.

At 1006, the content gallery server determines that the content does not include the restricted information. For example, the content analysis module 238 analyzes the visual content 254 of the content submission 248. As an example, the content analysis module 238 determines that the visual content 254 does not include one or more hand gestures associated with a criminal organization associated with the inmate user 206. In certain embodiments, the content analysis module 238 employs machine learning and/or pattern recognition techniques to determine whether the visual content 254 includes portions of the restricted information 236.

At 1008, the content gallery server determines that a face associated with the inmate is included in the content based on performing facial recognition analysis on the content. For example, the image analysis module 242 determines that a face associated with the user inmate user 206 is included in the visual content 254 based on performing facial recognition techniques on the visual content 254. In some embodiments, information corresponding to the face of the inmate user 206 is stored in the inmate profile 226(1) associated with the inmate user 206. In some embodiments, the content gallery 240(1) is associated with a collection of the authorized faces that indicates one or more faces that are permitted to be displayed in content included in the content gallery 240(1). Further, the collection of authorized faces may be included in the inmate profile 226(1) corresponding to the inmate user 206. In addition, the administration of the controlled environment can manage the collection of authorized faces and vet the people permitted to be displayed in the content of the content gallery 240(1)

At 1010, the content gallery server adds the content to the network accessible content gallery. For example, the content gallery server 212 adds the visual content 254 to the content gallery 240(1) associated with the content gallery identifier 252 in response to determining that the inmate user 206 is included in the visual content 254.

Figure 11:
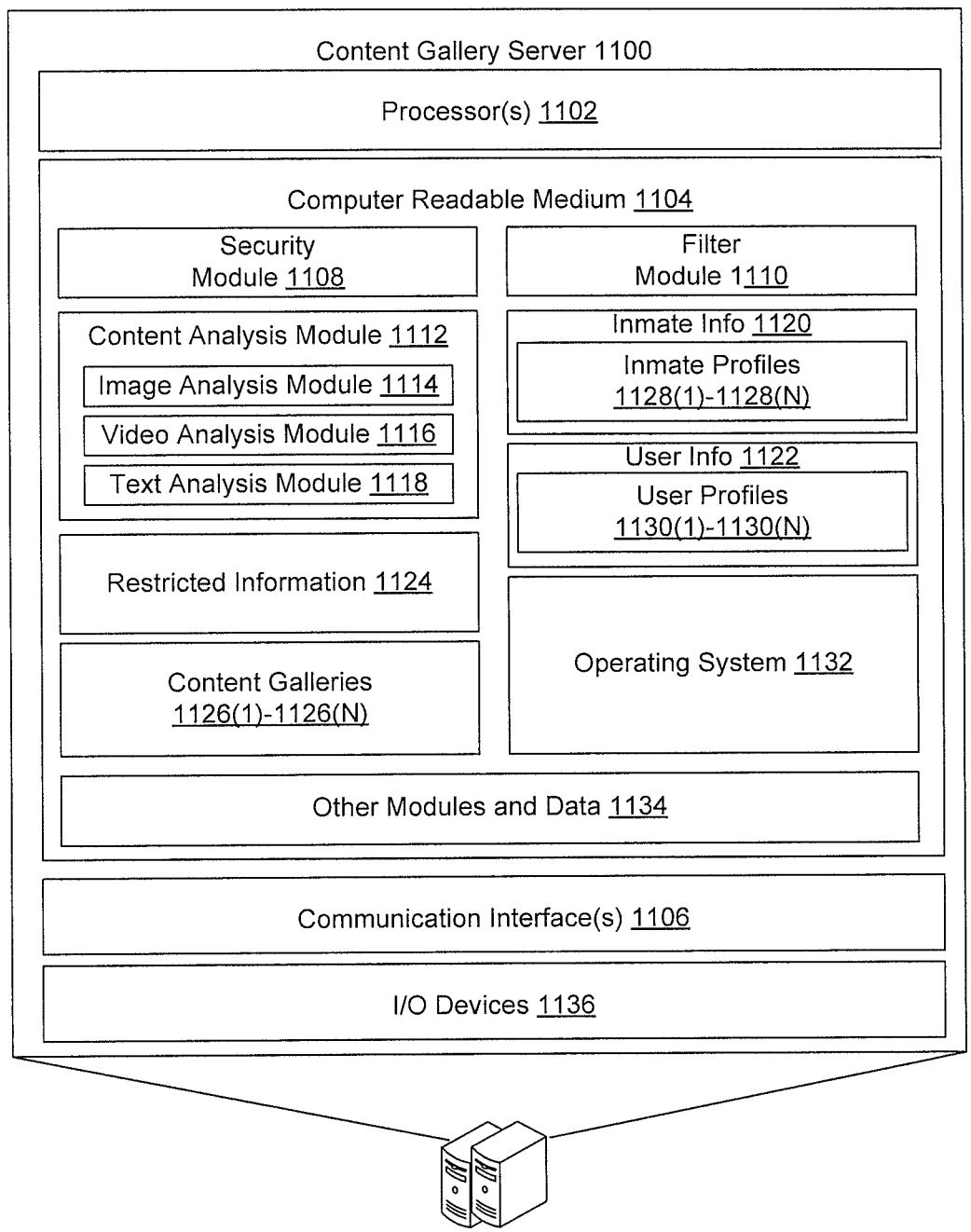
FIG. 11 illustrates a block diagram of select components of an example content gallery device, according to exemplary embodiments.

FIG. 11 illustrates a block diagram of select components of a content gallery server 1100, such as content gallery server 112 and content gallery server 212. The content gallery server 1100 includes one or more servers or other types of computing devices that may be embodied in any number of ways. For instance, the modules, other functional components, and data may be implemented on a single server, a cluster of servers, a server farm or data center, a cloud-hosted computing service, and so forth, although other computer architectures may additionally or alternatively be used.

Further, while the figures illustrate the components and data of the content gallery server 1100 as being present in a single location, these components and data may alternatively be distributed across different computing devices and different locations in any manner. Consequently, the functions may be implemented by one or more computing devices, with the various functionality described above distributed in various ways across the different computing devices. Multiple content gallery servers 1100 may be located together or separately, and organized, for example, as virtual servers, server banks and/or server farms. The described functionality may be provided by the servers of a single entity or enterprise, or may be provided by the servers and/or services of multiple different entities or enterprises.

In the illustrated example, the content gallery server 1100 includes one or more processors 1102, one or more computer-readable media 1104, and one or more communication interfaces 1106. Each processor 1102 is a single processing unit or a number of processing units, and may include single or multiple computing units or multiple processing cores. The processor(s) 1102 can be implemented as one or more microprocessors, microcomputers, microcontrollers, digital signal processors, central processing units, state machines, logic circuitries, and/or any devices that manipulate signals based on operational instructions. For instance, the processor(s) 1102 may be one or more hardware processors and/or logic circuits of any suitable type specifically programmed or configured to execute the algorithms and processes described herein. The processor(s) 1102 can be configured to fetch and execute computer-readable instructions stored in the computer-readable media 1104, which can program the processor(s) 1102 to perform the functions described herein.

The computer-readable media 1104 include volatile and nonvolatile memory and/or removable and non-removable media implemented in any type of technology for storage of information, such as computer-readable instructions, data structures, program modules, or other data. Such computer-readable media 1104 include, but are not limited to, RAM, ROM, EEPROM, flash memory or other memory technology, optical storage, solid state storage, magnetic tape, magnetic disk storage, network attached storage, storage area networks, cloud storage, or any other medium that can be used to store the desired information and that can be accessed by a computing device. Depending on the configuration of the content gallery server 1100, the computer-readable media 1104 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 1104 is used to store any number of functional components that are executable by the processors 1102. In many implementations, these functional components comprise instructions or programs that are executable by the processors and that, when executed, specifically configure the one or more processors 1102 to perform the actions attributed above to the content gallery server 1100. In addition, the computer-readable media 1104 store data used for performing the operations described herein.

In the illustrated example, the functional components stored in the computer-readable media 1104 include a security module 1108, a filter module 1110, and a content analysis module 1112. Additionally, the content analysis module includes an image analysis module 1114, a video analysis module 1116, and a textual analysis module 1118. Further, the computer-readable media 1104 store inmate information 1120, user information 1122, restricted information 1124, and content galleries 1126. In addition, the inmate information 1120 includes inmate profiles 1128, and the user information 1122 includes user profiles 1130.

Additional functional components stored in the computer-readable media 1104 include an operating system 1132 for controlling and managing various functions of the content gallery server 1100. The content gallery server 1100 also include or maintain other functional components and data, such as other modules and data 1134, which include programs, drivers, etc., and the data used or generated by the functional components. Further, the content gallery server 1100 includes many other logical, programmatic and physical components, of which those described above are merely examples that are related to the discussion herein.

The communication interface(s) 1106 include one or more interfaces and hardware components for enabling communication with various other devices, such as the inmate user device 204, the inmate device(s) 214, the employee device 218, or other computing devices, over the network(s) 222. For example, communication interface(s) 1106 facilitate communication through one or more of the Internet, cable networks, cellular networks, wireless networks (e.g., Wi-Fi, cellular) and wired networks. As several examples, the content gallery server 1100 and the inmate user device 204 communicate and interact with one another using any combination of suitable communication and networking protocols, such as Internet protocol (IP), transmission control protocol (TCP), hypertext transfer protocol (HTTP), cellular or radio communication protocols, and so forth. Examples of communication interface(s) include a modem, a network interface (such as an Ethernet card), a communications port, a PCMCIA slot and card, etc.

The content gallery server 1100 may further be equipped with various input/output (I/O) devices 1136. Such I/O devices include a display, various user interface controls (e.g., buttons, joystick, keyboard, mouse, touch screen, etc.), audio speakers, connection ports and so forth.

Figure 12:
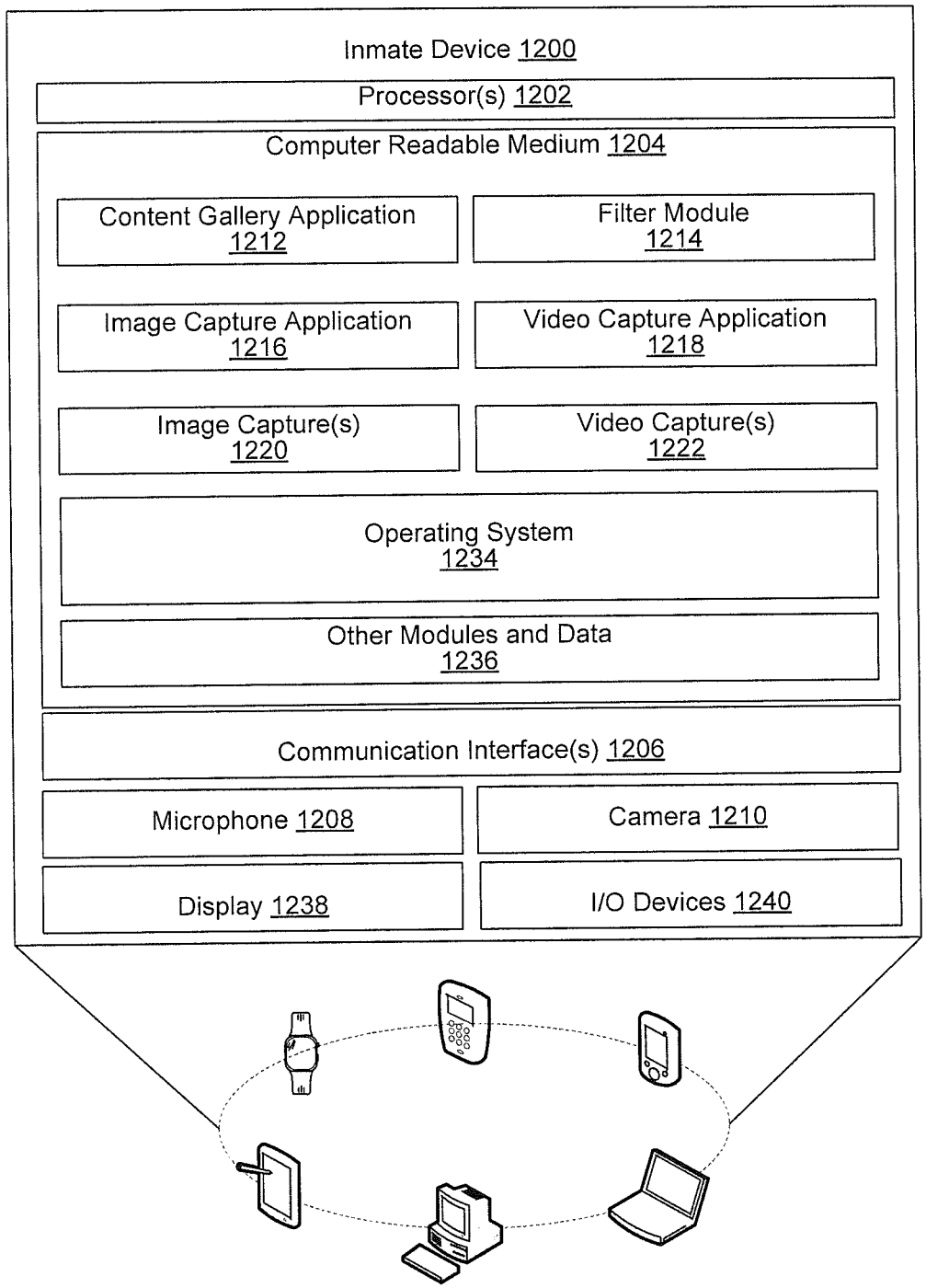
FIG. 12 illustrates a block diagram of select components of an example inmate device, according to exemplary embodiments.

FIG. 12 illustrates a block diagram of select example components of the inmate device 1200 (e.g., inmate device 104, the user device 108, the inmate user device 204, the companion devices 208, the employee devices 218, and the inmate devices 256) that implements the functionality described above, according to an exemplary embodiment. The inmate device 1200 may be any of a number of different types of personal computing devices. Some examples of the inmate device 1200 include smart phones and mobile communication devices, tablet computing devices, desktops, laptops, netbooks and other portable computers, wearable computing devices, and any other portable device capable of sending communications and performing the functions according to the techniques described herein.

In the illustrated example, the inmate device 1200 includes one or more processors 1202, one or more computer-readable media 1204, one or more communication interfaces 1206, a microphone 1208, and a camera 1210. Each processor 1202 is a single processing unit or a number of processing units, and may include single or multiple computing units or multiple processing cores. The processor(s) 1202 can be implemented as one or more microprocessors, microcomputers, microcontrollers, digital signal processors, central processing units, state machines, logic circuitries, and/or any devices that manipulate signals based on operational instructions. For instance, the processor(s) 1202 may be one or more hardware processors and/or logic circuits of any suitable type specifically programmed or configured to execute the algorithms and processes described herein. The processor(s) 1202 can be configured to fetch and execute computer-readable instructions stored in the computer-readable media 1204, which can program the processor(s) 1202 to perform the functions described herein.

The computer-readable media 1204 include volatile and nonvolatile memory and/or removable and non-removable media implemented in any type of technology for storage of information, such as computer-readable instructions, data structures, program modules, or other data. Such computer-readable media 1204 include, but are not limited to, RAM, ROM, EEPROM, flash memory or other memory technology, optical storage, solid state storage, magnetic tape, magnetic disk storage, network attached storage, storage area networks, cloud storage, or any other medium that can be used to store the desired information and that can be accessed by a computing device. Depending on the configuration of the inmate device 1200, the computer-readable media 1204 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 1204 is used to store any number of functional components that are executable by the processors 1202. In many implementations, these functional components comprise instructions or programs that are executable by the processors and that, when executed, specifically configure the one or more processors 1202 to perform the actions attributed above to the inmate device 104 and the inmate user device 204. In addition, the computer-readable media 1204 store data used for performing the operations described herein.

In the illustrated example, the functional components stored in the computer-readable media 1204 include a content gallery application 1212, a filter module 1214, an image capture application 1216, and a video capture application 1218. Further, the computer-readable media includes image capture(s) 1220 and video capture(s) 1222. In some embodiments, the filter module 1214 locally performs functions of the filter module 128 and the filter module 234 on the inmate device 1200.

The content gallery application 1212 provides media player functionality, such as playing audio, playing video, and viewing images. For example, the content gallery application 1212 displays the content of the content gallery 240(1) in any suitable arrangement (e.g., linear, carousel, grid, etc.). Some examples of supported file formats include AVI, MPEG, ASF, WMV, WMA, MOV, 3GP, OGG, OGM, MKV, WAV, AC, AC3, FLAC, FLV, F4V, MP4, MP3, JPEG, TIFF, BMP, PNG, and GIF. Further, the content gallery application 1212 provides functionality for editing image data and video data. For instance, the content gallery application 1212 provides functionality for cropping image data, rotating at least a portion of image data, marking up image data, labeling image data, the application of special effects to image data, and sequencing image data to generate a slideshow of images. Additionally, the content gallery application 1212 provides functionality for trimming video content, re-sequencing video content, adding transitions between video content, applying special effects to video content, and creating a playlist of video content. In addition, the content gallery application 1212 presents the graphical user interfaces and features of FIGS. 6 and 7, as described in detail above.

As used herein, image capture 1220 refers to image data captured by a recording device via an application of the inmate device 1200, such as the image capture application 1216. Further, video capture 1222 refers to video data captured by a recording device via an application of the inmate device 1200, such as the video capture application 1218. Once the inmate device 1200 stores content data (i.e., image capture 1220 and/or video capture 1222), the inmate device 1200 can send the content data to an content gallery server (e.g., content gallery server 112, content gallery server 212, or content gallery server 1100) to be added to a content gallery (e.g., content gallery 118, content galleries 240, or content galleries 1126).

Additional functional components stored in the computer-readable media 1204 include an operating system 1224 for controlling and managing various functions of the inmate device 1200. The inmate device 1200 also includes or maintains other functional components and data, such as other modules and data 1226, which include programs, drivers, etc., and the data used or generated by the functional components. Further, the inmate device 1200 includes many other logical, programmatic and physical components, of which those described above are merely examples that are related to the discussion herein.

The communication interface(s) 1206 includes one or more interfaces and hardware components for enabling communication with various other devices, such as the content gallery server 112 and content gallery server 212, or other computing devices, over the network(s) 114 and the network(s) 222. For example, communication interface(s) 1206 facilitates communication through one or more of the Internet, cable networks, cellular networks, wireless networks (e.g., Wi-Fi, cellular) and wired networks. As several examples, the content gallery server 212 and the inmate device 1200 communicate and interact with one another using any combination of suitable communication and networking protocols, such as Internet protocol (IP), transmission control protocol (TCP), hypertext transfer protocol (HTTP), cellular or radio communication protocols, and so forth. Examples of communication interface(s) include a modem, a network interface (such as an Ethernet card), a communications port, a PCMCIA slot and card, etc.

FIG. 12 further illustrates that the inmate device 1200 includes a display 1238. Depending on the type of computing device used as the inmate device 1200, the display 1228 may employ any suitable display technology. For example, the display 1228 may be a liquid crystal display, a light emitting diode display, or any other suitable type of display able to present digital content thereon. In some embodiments, the display 1228 includes touch sensor with the display 1238 to provide a touchscreen display configured to receive touch inputs for enabling interaction with a graphic interface presented on the display 1228. Accordingly, implementations herein are not limited to any particular display technology. Alternatively, in some other embodiments, the inmate device 1200 may not include a display 1228.

Furthermore, the inmate device 1200 is equipped with various input/output (I/O) devices 1230. Such I/O devices 1240 include a display, various user interface controls (e.g., buttons, joystick, keyboard, mouse, touch screen, etc.), audio speakers, connection ports, sensors (e.g., accelerometer, gyroscope, a compass, localization sensors, photometer, magnetometer, etc.), and so forth. Additionally, the inmate device 1200 includes various other components that are not shown, examples of which include removable storage, a power source, such as a battery and power control unit, and so forth.

What is claimed is:

1. A method for managing a social content gallery in a controlled environment, comprising:
   receiving content and a content tag from an inmate device, the content tag designating a recipient category, the recipient category identifying a group of individuals permitted to receive and view the content;
   determining an inmate associated with the inmate device;
   determining restricted submission information applicable to the content;
   determining that the content does not include the restricted submission information;
   receiving a request for the content from a consumer device associated with a user;
   identifying a social relation of the user to the inmate;
   determining that the user is within the recipient category based on the identified social relation;
   determining a filter associated with the content, the filter being dependent on the identified social relation and configured to modify a visual element within content;
   applying the filter to the visual element within the content to create filtered content; and
   sending the filtered content to the consumer device.

2. The method of claim 1, further comprising:
   receiving a comment submission from a commenter device, the comment submission including a comment and authentication information;
   determining a commenter based on the authentication information;
   authenticating the commenter based at least in part on the authentication information;
   determining restricted comment information applicable to the comment based on at least one of the inmate or the commenter;
   determining that the comment does not include the restricted comment information; and
   displaying the comment with the content.

3. The method of claim 1, further comprising receiving a filter selection from the inmate device, the filter selection associating the filter and the content.

4. The method of claim 1, further comprising determining that the user associated with the consumer device is approved to view the content based on authorization information associated with at least one of the inmate or the user.

5. The method of claim 1, further comprising:
   determining that a face associated with a person other than the inmate is included in the visual element within the content; and
   wherein applying the filter to the visual element within the content to create filtered content includes obfuscating the face associated with the person other than the inmate.

6. The method of claim 1, further comprising:
   determining an age of the user;
   wherein applying the filter to the visual element within the content to create filtered content further includes replacing a portion of the visual element within the content based on the age of the user.

7. The method of claim 1, further comprising:
   identifying that the visual element included within the content includes location information,
   wherein applying the filter to the visual element within the content to create filtered content further includes obfuscating the location information.

8. The method of claim 1, wherein the restricted information includes metadata identifying a location.

9. The method of claim 1, wherein the visual element within the content includes at least one of an image, a video capture, or an image slideshow.

10. The method of claim 1, wherein the restricted information includes at least one of profanity, slurs, obscenities, nudity, obscene gestures, or communications associated with criminal activity.

11. A method for managing a social content gallery in a controlled environment, comprising:
    receiving content and a content tag from a user device located outside of the controlled environment, the content tag designating an inmate of the controlled environment permitted to view the content;
    determining that an authorized face is included in the content;
    determining that the content does not include restricted submission information applicable to the content;
    receiving a request for the content from an inmate device associated with an inmate;
    determining that the inmate is permitted to receive content from a user of the user device based at least on a social relation of the inmate to the user;
    determining that the inmate is authorized to access the content; and
    sending the content to the inmate device.

12. The method of claim 11, further comprising;
determining that an unauthorized face is included in the content based on performing facial recognition analysis on the content;
applying a filter to the content to create filtered content, the filter obfuscating the unauthorized face; and
wherein sending the content to the inmate device comprises sending the filtered content to the inmate device.

13. The method of claim 11, further comprising:
receiving a comment submission from a commenter device, the comment submission including a comment and authentication information;
determining a commenter based on the authentication information;
authenticating the commenter based at least in part on the authentication information;
determining restricted comment information applicable to the comment based on the inmate and the commenter;
determining that the comment does not include the restricted comment information; and
displaying the comment with the content.

14. The method of claim 11, further comprising determining the restricted submission information based on the user.

15. The method of claim 11, further comprising:
identifying textual information included in the content;
applying a filter to the content, the filter obfuscating the textual information within the content; and
wherein sending the content to the inmate device comprises sending the filtered content to the inmate device.

16. The method of claim 1, wherein the content includes at least one of an image, a video capture, or an image slide show.

17. A system for distributing content created by an inmate located within a controlled environment, the content being received via a secure private network from an inmate device associated with the inmate, the system comprising:
a network accessible content gallery associated with the inmate; and
one or more processors and/or circuits configured to:
receive the content and a content tag from the inmate device, the content tag designating a recipient category that identifies a group of individuals permitted to receive and view the content;
determine restricted submission information applicable to the content;
determine that the content does not include the restricted submission information;
determine that a face associated with the inmate is included in the content based on performing facial recognition analysis on the content;
add the content to the network accessible content gallery based upon the face associated with the inmate being included in the content;
receive a request for the content from a consumer device associated with a user;
identify a social relation of the user to the inmate; and
determine that the user is within the recipient category based on the identified social relation.

18. The system of claim 17, wherein the one or more processors and/or circuits are further configured to:
determine a filter based on filter selection information provided by the inmate, the filter configured to modify the content;
apply the filter to the content to create filtered content; and
send the filtered content to the consumer device.

19. The system of claim 17, wherein the one or more processors and/or circuits are further configured to:
receive a comment submission from a commenter device, the comment submission including a comment;
determine restricted comment information applicable to the comment;
determine that the comment does not include the restricted comment information; and
display the comment with the content.

20. The system of claim 17, wherein the one or more processors and/or circuits are further configured to:
determine that a face associated with a person other than the inmate is included in the content based on performing facial recognition analysis on the content;
apply a filter to the content to create filtered content, the filter obfuscating the face associated with the person other than the inmate; and
sending the filtered content to a consumer device.

* * * * *